US012665205B2

(12) United States Patent
Wang et al.

(10) Patent No.: US 12,665,205 B2
(45) Date of Patent: Jun. 23, 2026

(54) AUTOMATED COIN CELL BATTERY MANUFACTURING SYSTEM

(71) Applicant: Automat Solutions, Inc., San Leandro, CA (US)

(72) Inventors: Xuejun Wang, Pleasanton, CA (US); Javier Rivera, Fremont, CA (US); Xiaoliang Wang, Alameda, CA (US)

(73) Assignee: Automat Solutions, Inc., San Leandro, CA (US)

( * ) Notice: Subject to any disclaimer, the term of this patent is extended or adjusted under 35 U.S.C. 154(b) by 823 days.

(21) Appl. No.: 17/942,809

(22) Filed: Sep. 12, 2022

(65) Prior Publication Data

US 2024/0088404 A1     Mar. 14, 2024

(51) Int. Cl.
*H01M 6/00*          (2006.01)
*H01M 50/109*       (2021.01)
*H01M 50/167*       (2021.01)

(52) U.S. Cl.
CPC ......... *H01M 6/005* (2013.01); *H01M 50/109* (2021.01); *H01M 50/167* (2021.01)

(58) Field of Classification Search
CPC .. H01M 6/005; H01M 50/109; H01M 50/167; H01M 10/0404; H01M 50/609; Y02E 60/10; Y02P 70/50
See application file for complete search history.

(56) References Cited

U.S. PATENT DOCUMENTS 11,198,215 B1 * 12/2021 Scott ........................ B25J 9/104

2015/0249258 A1 * 9/2015 Wolf ................... H01M 10/049
                                                                   29/730
2017/0217013 A1 * 8/2017 Iqtidar ................... B29C 64/20

FOREIGN PATENT DOCUMENTS

CN          201829565 U  *  5/2011

OTHER PUBLICATIONS

Chen et al. (CN201829565U and using Machine Translation as English version) (Year: 2011).*

* cited by examiner

*Primary Examiner* — Wyatt P McConnell
*Assistant Examiner* — Joshua P McClure
(74) *Attorney, Agent, or Firm* — Cognition IP, P.C.; Edward Steakley; Justin White

(57)          ABSTRACT

An automated coin cell battery manufacturing system can include a holding arrangement, an electrolyte dispensing component, a case providing component, a pick and place component, and a crimping component. The holding arrangement can hold multiple partially assembled coin cells that can each include electrode(s) and a spacer within a coin cell cap. The electrolyte dispensing component can automatically dispense electrolyte material into the partially assembled coin cells, and the electrolyte material can be different for different coin cells. The case providing component can store multiple coin cell cases and automatically provide the stored coin cell cases. The pick and place component can automatically pick the coin cell cases from the case providing component and can automatically place the coin cell cases on the multiple partially assembled coin cells to form fully assembled coin cells within the holding arrangement. The crimping component can automatically crimp the fully assembled coin cells.

20 Claims, 17 Drawing Sheets

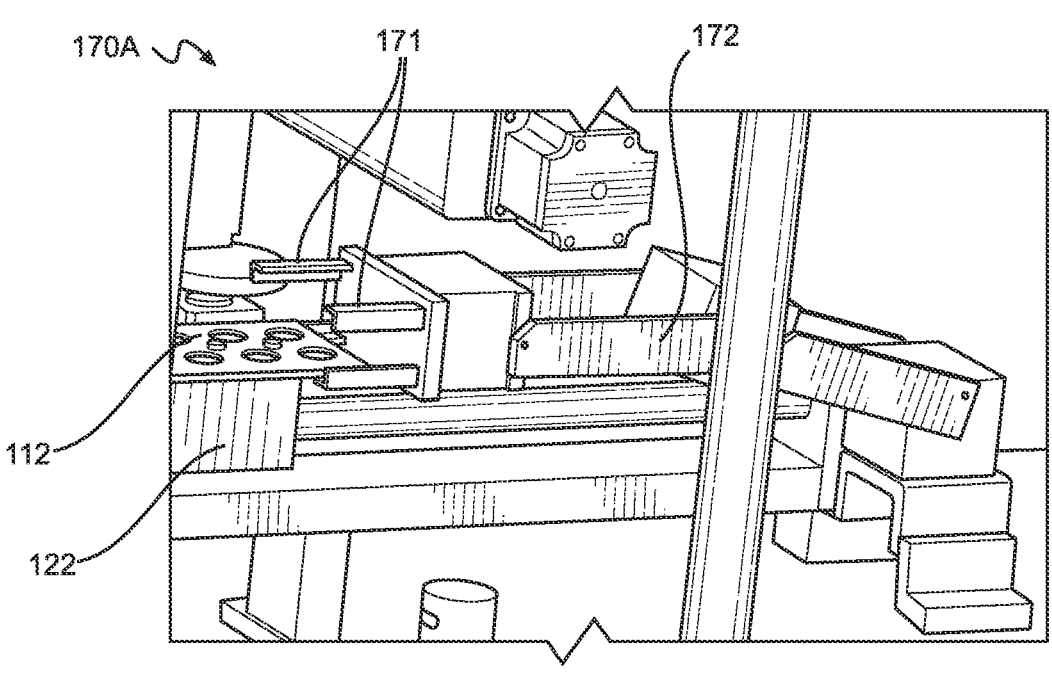
FIG. 9A
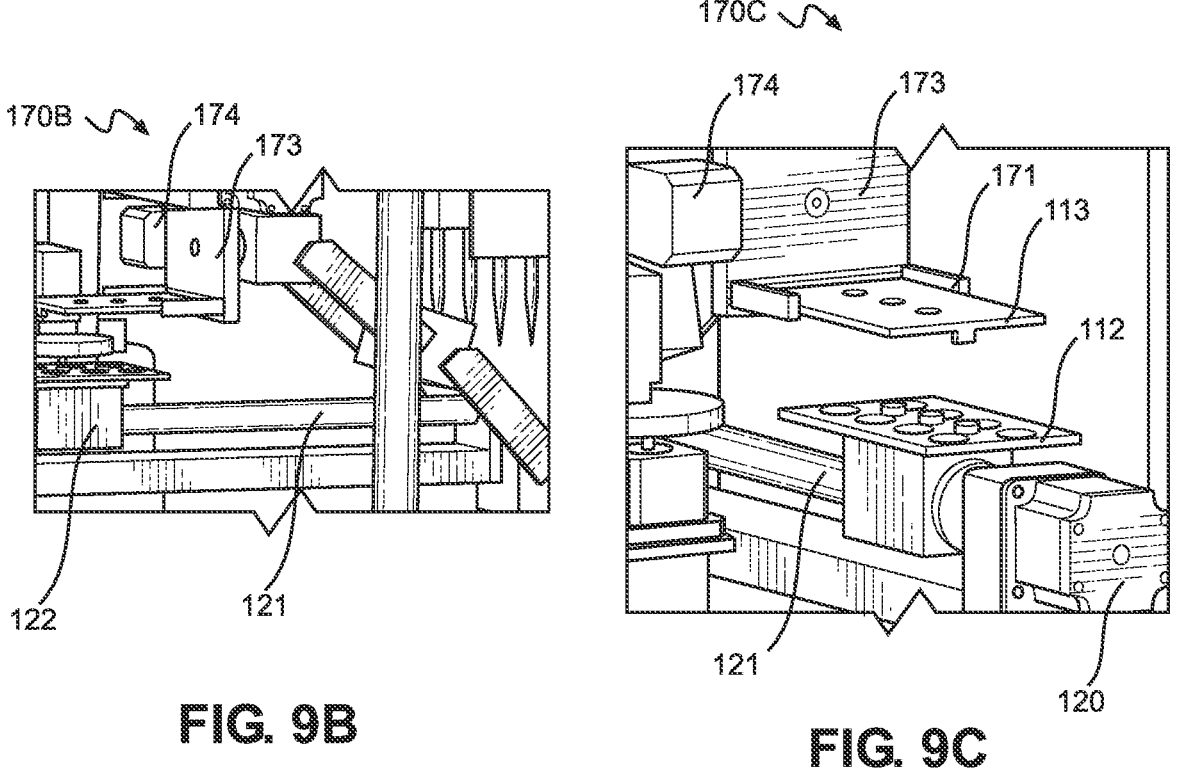
FIG. 9B
FIG. 9C

START — 222

FORM COIN CELLS IN BOTTOM PLATE OF HOLDING ARRANGEMENT — 224

PLACE TOP PLATE ATOP BOTTOM PLATE WITH COIN CELLS — 226

GRIP AND HOLD TOP PLATE AND BOTTOM PLATE TOGETHER — 228

FLIP OVER BOTTOM PLATE AND TOP PLATE TOGETHER — 230

REMOVE BOTTOM PLATE FROM TOP PLATE — 232

END — 234

AUTOMATED COIN CELL BATTERY MANUFACTURING SYSTEM

TECHNICAL FIELD

The present disclosure relates generally to battery manufacturing, and more particularly to systems and methods for the manufacture of coin cell batteries.

BACKGROUND

Varying degrees of automation can be used for the mass manufacture of well-defined coin cell batteries that are all exactly alike, and there are industrial coin cell battery ("coin cell") assembly lines that can be used for fixed workflows with strictly defined components and procedures. Partially or fully automated systems and components can include, for example, the MTI MSK-HT-16 coin cell crimping system made by MTI Corporation of Richmond, California. Another partially automated system can involve a fixed process that assembles the same components into multiple coin cells on a multiple coin cell assembly plate and then injects the same electrolyte material into each of the multiple coin cells on the plate.

Where variations are desired, however, there are no fully automated systems available for the assembly of coin cells formed from different or varying materials and/or components. Manual assembly techniques are thus used for research applications or other instances that require differences between coin cells. Traditional variable coin cell formation can involve a technician putting together various coin cell parts (e.g., anode case, spring, spacer, lithium, separator, etc.), dispensing an electrolyte into the partial assembly with a pipette, placing a cathode case to close the coin cell, and then manually inserting the coin cell into a crimper and waiting for the crimper to seal the coin cell. This whole process is often performed in an inert environment such as an argon filled glovebox.

Unfortunately, manual assembly techniques can be highly labor intensive, time consuming, more wasteful (e.g., due to fluid spillage) and error prone, especially for formulating and testing large numbers of coin cells of varying material compositions. Bottlenecks in known manual processes can include decking individual coin cell components (e.g., cases, electrodes, springs, separators, etc.), dispensing electrolytes accurately, and crimping the final coin cells reliably. In many instances, a single scientist or technician can only formulate and test a few samples each week.

Although traditional ways of assembling variable coin cells have worked well in the past, improvements are always helpful. In particular, what is desired are variable coin cell manufacturing systems and methods that are more automated, more accurate, more versatile, and faster with respect to existing variable coin cell assembly processes.

SUMMARY

It is an advantage of the present disclosure to provide coin cell manufacturing systems and methods that are more automated, accurate, versatile, and faster than known coin cell assembly processes. The disclosed features, apparatuses, systems, and methods provide improved coin cell manufacturing solutions that allow for the rapid and automated formation of coin cells having varying materials. These advantages can be accomplished in multiple ways, such as by using various robotic subsystems and components that perform coin cell assembly steps with varying materials that have been traditionally performed manually by technicians.

In various embodiments of the present disclosure, an automated coin cell battery manufacturing system can include, but is not limited to, a holding arrangement, an electrolyte dispensing component, a case providing component, a pick and place component, and a crimping component. The holding arrangement can be configured to hold multiple partially assembled coin cells therewithin. Each of the multiple partially assembled coin cells can include at least one electrode and at least one spacer placed within a coin cell cap. The electrolyte dispensing component can be configured to automatically dispense electrolyte material into the multiple partially assembled coin cells within the holding arrangement. The automatically dispensed electrolyte material can be different for different coin cells within the multiple partially assembled coin cells. The case providing component can be configured to store multiple coin cell cases and can be configured to automatically provide the stored coin cell cases. The pick and place component can be configured to automatically pick the coin cell cases from the case providing component and to automatically place the coin cell cases on the multiple partially assembled coin cells to form fully assembled coin cells within the holding arrangement. The crimping component can be configured to automatically crimp the fully assembled coin cells.

In various detailed embodiments, the pick and place component can be further configured to automatically pick the fully assembled coin cells from the holding arrangement, to automatically place the fully assembled coin cells into the crimping component, to automatically pick the crimped coin cells from the crimping component, and to automatically place the crimped coin cells to a final location, which can be within the holding arrangement. In some embodiments, the overall system can include a partial assembly component configured to facilitate the automated formation of the multiple partially assembled coin cells within the holding arrangement. In such embodiments, the pick and place component can be further configured to automatically pick the electrodes and the spacers from the partial assembly component and to automatically place the electrodes and the spacers within the coin cell caps within the holding arrangement. In some instances, the holding arrangement can include multiple wells with each of the multiple wells being configured to hold a single partially assembled coin cell, and wherein the multiple wells are arranged into a matrix of multiple rows and multiple columns. Also, the holding arrangement can include a bottom plate configured to hold the multiple partially assembled coin cells and a top plate configured to hold the fully assembled coin cells. The top plate can fit atop the bottom plate. The overall system can then also include a flipping component configured to place automatically the top plate on top of the bottom plate while the fully assembled coin cells are within the bottom plate, flip over automatically the bottom plate and top plate together, and remove automatically the bottom plate from the top plate such that the fully assembled coin cells remain within the top plate.

In further detailed embodiments, the case providing component can include a tower component that holds a column of cases and a rotating component located beneath the tower component. Rotation of the rotating component can move a single case from the column of coin cell cases to a receiving position for the pick and place component. In some arrangements, the tower component can be further configured to hold a column of coin cell caps, and further rotation of the rotating component can result in moving a single coin cell cap from the column of coin cell caps to a cap receiving position for the pick and place component. The pick and place component can include a robotic arm and an end effector that picks and places the coin cell cases. The end effector can include a suction component and a vacuum conduit coupled thereto, and the vacuum conduit can be configured to be coupled to a vacuum source to provide a vacuum to the suction component. The system can also include a positioning component configured to position the holding arrangement, and the positioning component can be configured to move automatically the holding arrangement to multiple different locations to facilitate automated activities of the electrolyte dispensing component and the pick and place component. The system can also include one or more processors in communication with and configured to control the automated functions of the electrolyte dispensing component, the case providing component, the pick and place component, and the crimping component.

In further embodiments of the present disclosure, various methods of manufacturing coin cell batteries are provided. Pertinent process steps can include dispensing electrolyte material, providing coin cell cases, picking the coin cell cases, placing the coin cell cases, and crimping coin cells. The electrolyte material can be automatically dispensed into multiple partially assembled coin cells within a holding arrangement, and each of the multiple partially assembled coin cells can include at least one electrode and at least one spacer placed within a coin cell cap. The automatically dispensed electrolyte material can be different for different coin cells within the multiple partially assembled coin cells. Multiple coin cell cases can be automatically provided from a case providing component configured to store the multiple coin cell cases. The multiple coin cell cases can be automatically picked from the case providing component and can be automatically placed onto the multiple partially assembled coin cells to form fully assembled coin cells within the holding arrangement. The fully assembled coin cells can be automatically crimped with a crimping component.

In various detailed embodiments, an additional process step can involve forming automatically the multiple partially assembled coin cells within the holding arrangement. Further process steps can include picking automatically the fully assembled coin cells from the holding arrangement, placing automatically the fully assembled coin cells into the crimping component, picking automatically the crimped coin cells from the crimping component, and placing automatically the crimped coin cells to a final location. The holding arrangement can include a bottom plate configured to hold the multiple partially assembled coin cells and a top plate configured to hold the multiple fully assembled coin cells, and the top plate can fit atop the bottom plate. In such arrangements, further process steps can include placing automatically the top plate on top of the bottom plate while the multiple fully assembled coin cells are within the bottom plate, flipping over automatically the bottom plate and top plate together, and removing automatically the bottom plate from the top plate such that the multiple fully assembled coin cells remain within the top plate. The case providing component can include a tower component configured to hold a column of cases and a rotating component located beneath the tower, and an additional process step can include rotating automatically the rotating component to move a single case from the bottom of the column of cases to a receiving position to be picked from the case providing component. Also, the holding arrangement can be moved automatically to multiple different locations to facilitate the dispensing, the picking, and the placing.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems, and methods for automated coin cell manufacturing. These drawings in no way limit any changes in form and detail that may be made to the disclosure by one skilled in the art without departing from the spirit and scope of the disclosure.

FIG. 9A illustrates in side perspective view an example flipping component for an automated coin cell battery manufacturing system gripping a bottom plate of a holding arrangement on a movable base according to one embodiment of the present disclosure.

FIG. 9B illustrates in side perspective view the flipping component of FIG. 9A gripping a top plate of a holding arrangement according to one embodiment of the present disclosure.

FIG. 9C illustrates in front perspective view the flipping component of FIG. 9A gripping the top plate according to one embodiment of the present disclosure.

FIG. 9D illustrates in front perspective view the flipping component of FIG. 9A placing the top plate on the bottom plate according to one embodiment of the present disclosure.

FIG. 9E illustrates in front perspective view the flipping component of FIG. 9A gripping the top plate and bottom plate together according to one embodiment of the present disclosure.

FIG. 9F illustrates in front perspective view the flipping component of FIG. 9A lifting the top plate and bottom plate together according to one embodiment of the present disclosure.

DETAILED DESCRIPTION

Figure 1:
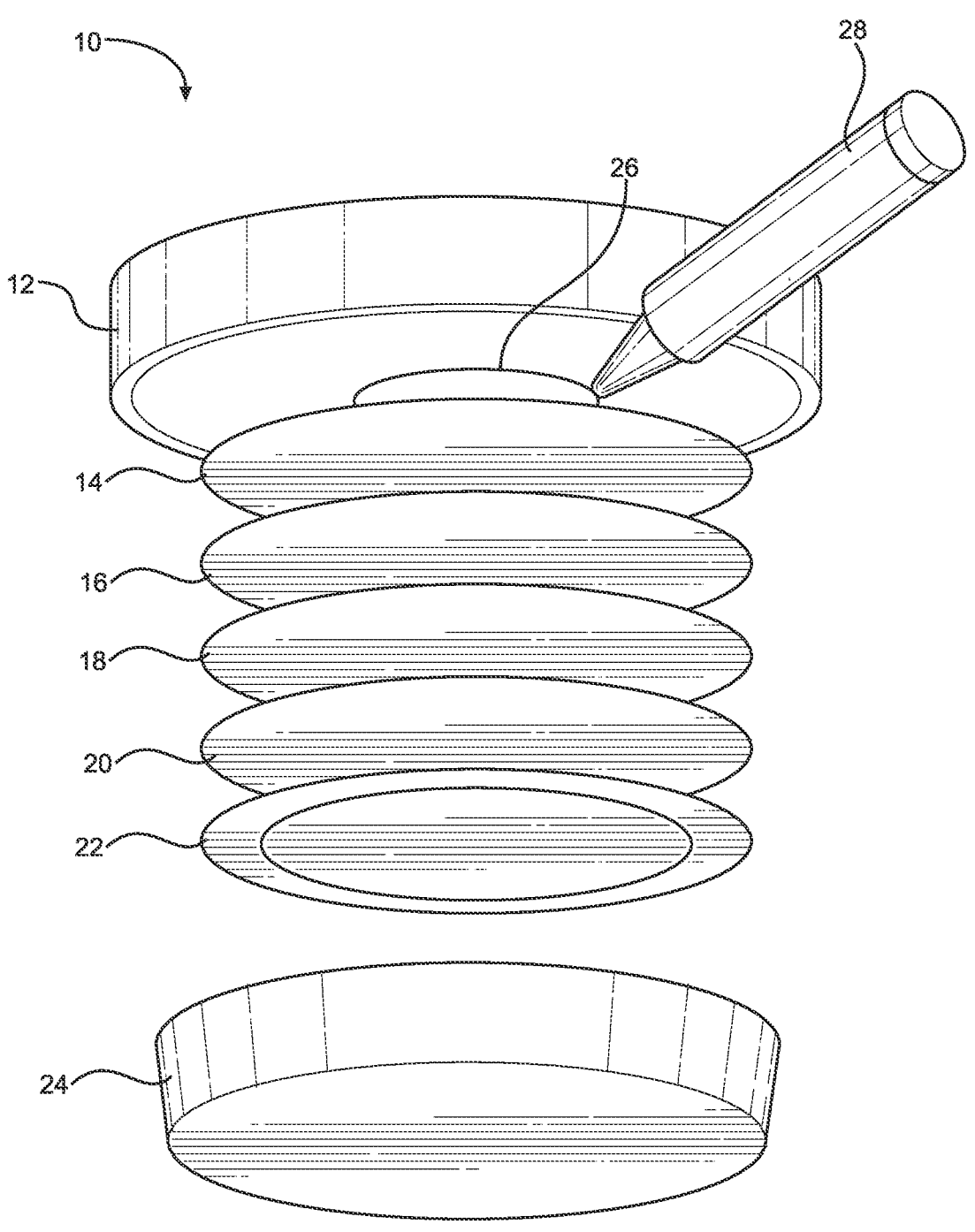
FIG. 1 illustrates in side exploded view an example coin cell battery.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to apparatuses, systems, and methods for manufacturing coin cell batteries ("coin cells"). The disclosed embodiments provide improved coin cell manufacturing solutions that allow for the rapid and reliable formation of coin cells having varying materials. In particular, the disclosed embodiments can utilize various automated subsystems, components, and features to improve upon or replace traditional manual methods of forming coin cells having varying electrolyte fluid contents and/or other variable internal components.

In various embodiments disclosed herein, fully automatic or semi-automatic coin cell manufacturing systems can combine partial coin cell preparation, robotic electrolyte dispensing, robotic component picking and placing, and/or robotic coin cell crimping, among other automated functions, within an overall coin cell assembly process. The disclosed systems can assemble about 24 or more coin cells per hour as a throughput amount, which can be 5 to 10 times faster than current manual coin cell assembly processes. Also, coin cell quality can be more accurate, spillage and waste amounts can be reduced, and a higher level of versatility in formation techniques and differences between formed coin cells can be achieved using the disclosed apparatuses, systems, and methods. The disclosed systems and methods provide numerous advantages that are lacking in any existing automated coin cell formation systems, such as, for example, the partial assembly of coin cells with different anode and/or cathode materials, the automated dispensing of different types of electrolyte materials into different coin cells, the automated placing of coin cell cases as final components of variable material coin cells, automated pick and place crimping procedures, and the automated manufacturing of coin cells having variable compositions and volumes of electrolyte materials in general.

It will be appreciated that all or only some of the disclosed features, components, and/or subsystems can be used in a given overall system, which can result in a semi-automated system that is still an improvement over current predominantly manual variable coin cell formation processes. It will also be understood that the disclosed systems can be further expanded to include one or more additional features, components, and/or subsystems to result in more robust fully automated coin cell manufacturing systems. For example, additional robotic picking and placing components or subsystems can be added to fully automate an overall system.

In addition, while the disclosed systems and methods illustrate and discuss the assembly of 2025 type coin cells having diameters of 20 mm and thicknesses of 2.5 mm, it will be readily appreciated that the disclosed embodiments can be used or suitably altered to form coin cells of different types and dimensions. Similarly, while the disclosed systems and methods discuss dispensing between about 0.10 to 0.15 ml of electrolyte fluid into different coin cells during assembly, it will be understood that lesser or greater amounts of electrolyte fluid may be dispensed into coin cells as may be desired for a given application. Other extrapolations and variations of the features, components, systems, and methods disclosed herein are also possible.

FIG. 1 illustrates in side exploded view an example coin cell. Coin cell 10 can be a 2025 type coin cell, for example, and can include cell case 12, first electrode 14, separator 16, second electrode 18, spacer 20, spring 22, and cell cap 24, among other possible components. An electrolyte fluid 26 can be added into coin cell 10 proximate cell case 12, and this can be accomplished using a fluid injection component 28. In some arrangements, cell case 12 can be a cathode case and cell cap 24 can be an anode cap. As will be readily appreciated, coin cell 10 is just one example of many different possible types of coin cells, that various other components, materials, and arrangements can be used in the formation of a given coin cell, that not every item shown in FIG. 1 need be used for a given coin cell, and that other types of coin cells beyond 2025 coin cells can be applicable to the present disclosure.

It will also be appreciated that a wide variety of processes and techniques can be used to form a coin cell, such as coin cell 10 or any other given coin cell. In some general processes, for example, some or all of the internal components of coin cell 10 (e.g., items 22, 20, 18, 16, and 14) can be stacked within cell cap 24 in their proper order, electrolyte fluid 26 can be added atop first electrode 14, after which cell case 12 can be placed atop the entire assembly, after which cell case 12 and cell cap 24 can then be crimped together to seal the coin cell. In situations where it is desirable to vary the compositions and/or amounts of electrolyte fluid 26 and/or one or more other internal components from coin cell to coin cell, this general formation process tends to be mostly or fully manual due to the variable nature of the materials used.

Figure 2:
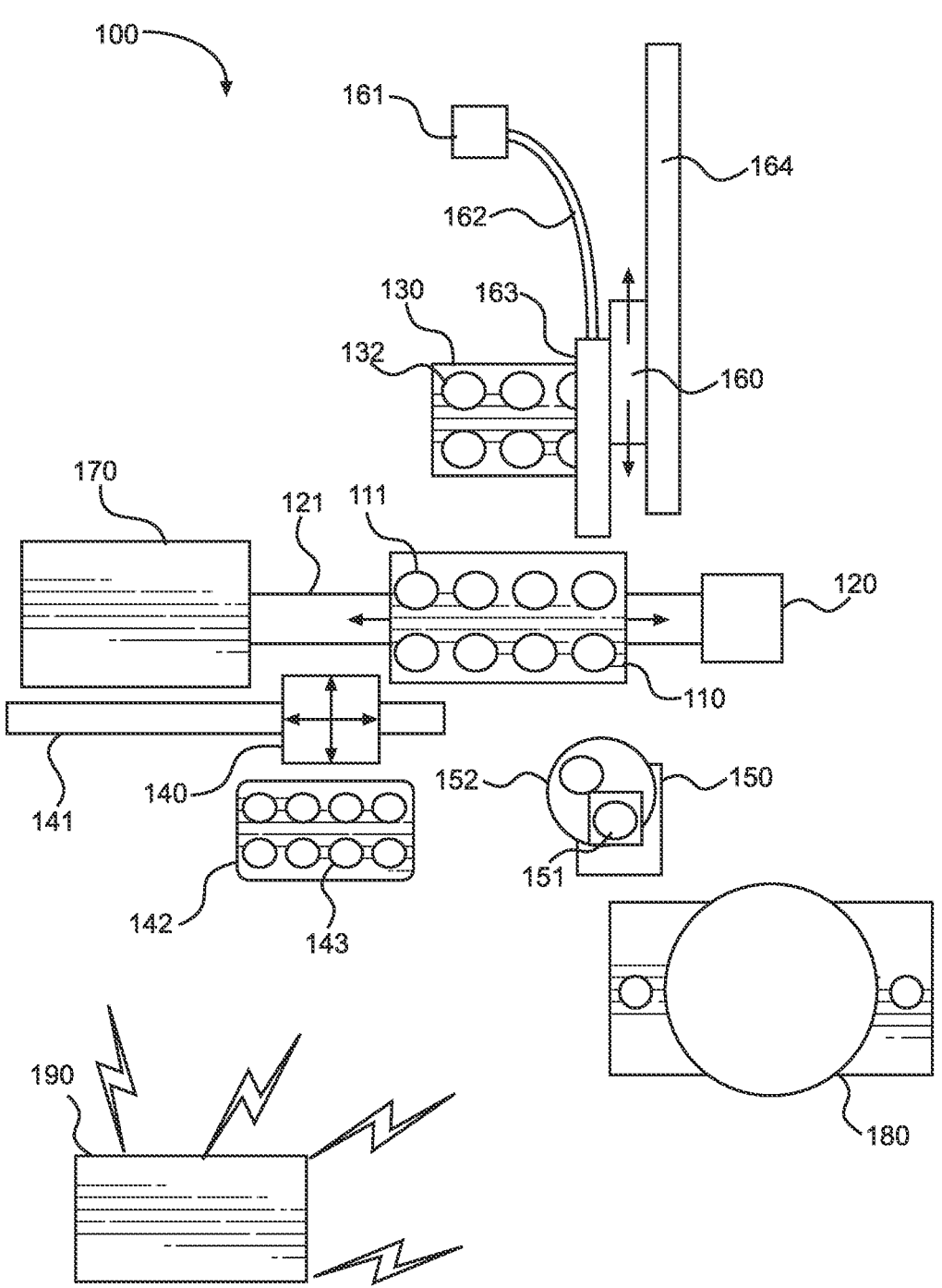
FIG. 2 illustrates in diagrammatic top plan view an example automated coin cell battery manufacturing system according to one embodiment of the present disclosure.

Turning next to FIG. 2, an example automated coin cell battery manufacturing system is shown in diagrammatic top plan view. Automated coin cell battery manufacturing system 100, which is not necessarily illustrated to scale, can parallelize and automate various coin cell making procedures and functions to allow many coin cells to be made without human intervention, at a faster pace, and with greater accuracy. System 100 can combine, integrate, and automate at least the coin cell making procedures and functions of, for example, partial coin cell preparation, electrolyte dispensing, coin cell case and full coin cell picking and placing, and/or coin cell crimping in a high throughput mode. Other coin cell making procedures and functions in an overall coin cell manufacturing process may also be similarly automated.

Automated coin cell battery manufacturing system 100 can include various subsystems, components, and features configured to automate some or all of the process steps, procedures, and/or functions needed to form coin cells, such as coin cell 10 above, and it will be appreciated that not all of the various subsystems, components, and features shown in FIG. 2 are needed for a given automated system. Various items shown in FIG. 2 can be substituted or even omitted in some systems, and some systems may include other subsystems, components, and features that also facilitate the assembly or manufacture of coin cells. As shown, automated coin cell battery manufacturing system 100 can include, for example, holding arrangement 110, positioning component 120, partial assembly component 130, electrolyte dispensing component 140, case providing component 150, pick and place component 160, flipping component 170, crimping component 180, and processing component 190, among other possible significant subsystems, components, and features of an overall system.

Holding arrangement 110 can hold individual partially and/or fully assembled coin cells within multiple wells 111 that are dimensioned for the coin cells being manufactured. This can be accomplished in a variety of ways, such as, for example, using one or more plates with wells 111 arranged into a matrix of rows and columns. For example, plates having a 2×4 or a 2×5 arrangement of wells 111 can be used, although other matrix sizes are also possible. Further, although top and bottom plates are provided as one possible example of a holding arrangement 110, it will be appreciated that other types and arrangements of holding arrangements may alternatively be used.

Positioning component 120 can facilitate moving holding arrangement 110 in one or more directions during a manufacturing process. For example, holding arrangement 110 can be moved laterally forward or backward in an "X" direction along a track or rail 121 to multiple possible positions. This can be accomplished using a computer controlled stepper motor within positioning component 120, which can rotate a ball screw or rack and pinion arrangement having a moving base upon which holding arrangement 110 can be removably placed. Automated computer control can be managed by processing component 190, for example. Positioning component 120 can include multiple similar arrangements where movement of the base (and placed holding arrangement) is desired in two or three dimensions, as will be readily appreciated.

Partial assembly component 130 can be located near holding arrangement 110 and/or rail 121 to facilitate the partial assembly of coin cell components within the wells 111 of the holding arrangement. Partial assembly component 130 can include various storage areas 132 to store various internal coin cell components, which storage areas can be accessed by one or more computer controlled automated pick and place components to form partially assembled coin cells within some or all of the wells 111 of holding arrangement 110. For example, a cell cap can be placed at the bottom of each well 111, and a spring, spacer, second electrode, separator, and first electrode, among other possible components, can then all be stacked into each cell cap to form the partially assembled coin cells within holding arrangement 110. In some arrangements each of these items can be individually placed into the well or cell cap, and in other arrangements the partially assembled coin cells can be formed away from the holding arrangement and then placed into the wells. Forming partially assembled coin cells within the wells 111 of holding arrangement 110 can be performed entirely automatically by a computer controlled partial assembly component 130, although some portions of this process can be performed manually. In some arrangements, partial assembly component 130 can be an optional unit such that forming the partially assembled coin cells within the wells 111 of the holding arrangement 110 can be a manually performed procedure.

In the event that the partial assembly of coin cell components into wells 111 is fully automated, one or more further components or subsystems within overall automated coin cell battery manufacturing system 100 can interact with partial assembly component 130. For example, pick and place component 160 (detailed below) can be used to automatically move coin cell caps and/or various internal coin cell components from storage areas 132 within partial assembly component 130 and/or other locations into the wells 111 of holding arrangements 110. Each separate storage area 132 can store a stack or tower of multiple components of the same type. Storage areas 132 of partial assembly component 130 can be arranged into a matrix in some embodiments, such as a 2×3 matrix as shown. Alternatively, other matrix formations or arrangements may also be used. For example, a 5×1 or 6×1 matrix arrangement may be suitable for ease of operation with a pick and place component 160 that operates in a "Y" direction and possibly a "Z" direction (not shown), but not in an X direction.

Alternatively, or in addition, one or more coin cell cap and/or other internal part providing components similar to case providing component 150 (detailed below) can be used alongside or in place of partial assembly component 130 to store and provide coin cell caps and/or internal parts for the partial assembly of coin cells. In various alternative embodiments, an alternative cap and case providing component 250 (detailed below) can be used instead of case providing component 150 to provide both coin cell caps and coin cell cases in fully automated fashion.

Electrolyte dispensing component 140 can include a liquid handling robot, which can be any suitable robot from an automated liquid handling system, such as, for example, the OT-2 liquid handling robotic system made by Opentrons Labworks Inc. of New York, New York. This can include one or more pipettes on a robotically computer controlled head or manifold that is configured to move in multiple directions along one or more tracks 141. The pipette(s) can draw electrolyte fluids from multiple vials or other fluid reservoirs 142 arranged in an array 143 near the holding arrangement 110 and then dispense the electrolyte fluids into the partially assembled coin cells within the wells 111 of the holding arrangement. Automated control of electrolyte dispensing component 140 can be conducted by one or more processors within the liquid handling robot itself, which can be managed by processing component 190, for example.

Case providing component 150 can be a specially designed subsystem configured to store coin cell cases and to automatically provide the coin cell cases during the assembly of coin cells within the wells 111 of holding arrangement 110. Coin cell cases can be stored in a storage region 151 within case providing component 150, and these coin cell cases can be automatically moved from this storage region to a receiving position 152 where the cases can then be picked from the case providing component. This can be accomplished using a computer controlled process managed by processing component 190 to move the cases as desired.

Pick and place component 160 can include an integrated multi-axis robotic arm that can be configured to automatically pick and place various items, such as coin cell caps, internal components, and cases, as well as fully assembled coin cells. Vacuum source 161 can provide and regulate a vacuum along vacuum tube 162 to a specially designed end effector 163 coupled to the robotic arm of pick and place component 160, which can move laterally in a "Y" direction along track 164, for example. Movement vertically in a "Z" direction along a different track is also possible, as noted below. Lateral movement in an "X" direction along still another track (not shown) is also possible, and an alternative trackless multi-axis robotic arm arrangement may also be used in some arrangements. Vacuum regulating and robotic arm movement functions can be accomplished using a computer controlled process managed by processing component 190. End effector 163 can include a suction component formed from rubber or other suitable material to facilitate the picking and placing of items, as set forth in greater detail below.

Flipping component 170 can be used to flip over holding arrangement 110 with the fully assembled coin cells contained inside. Flipping component 170 can include one or more gripping components and an integrated multi-axis robotic arm that can be configured to pick, flip over, and place top plates, bottom plates, and/or other relevant parts of holding arrangement 110. Flipping can be accomplished using one or more computer controlled stepper motors within flipping component 170, and automated computer control can be managed by processing component 190, for example.

Crimping component 180 can be a customized automated coin cell crimping subsystem that can include a lower die configured to receive a coin cell and an upper die configured to compress against a coin cell placed in the lower die. This can be accomplished using a computer controlled hydraulic press configured to compress a fully assembled coin cell together to crimp or otherwise seal the coin cell cap to the coin cell case. Automated computer control can be managed by processing component 190, for example.

Processing component 190 can include one or more processors in communication with and configured to control the automated functions of various subsystems and components of overall automated coin cell battery manufacturing system 100, such as positioning component 120, partial assembly component 130, electrolyte dispensing component 140, case providing component 150, pick and place component 160, flipping component 170, and/or crimping component 180, among other possible subsystems and components. Communications between processing component 190 and the various subsystems and components of system 100 can be wireless, wired, and/or through any other suitable type of system communication.

In some arrangements, an automatic control program can define different workflows for different overall system functions and subsystem and component activities. One or more custom software packages can also be included to control the system and its various subsystems and components in a coordinated manner. For example, various scripts can be used to control functions of the liquid handling robot of electrolyte dispensing component 140, such as to upload files, trigger electrolyte dispensing protocols, home the liquid handling system, draw and dispense electrolyte fluids, and the like. Various scripts can also be used to control other system functions, for example, such as those that operate various system motors and control operations of the vacuum pump at specific times. Further, one or more scripts can be used to control the functions of crimping component 180. Finally, one or more scripts can utilize all other functions and integrate them into an overall coordinated workflow. In some arrangements, one or more manual operator checks or confirmations can be included with an overall automated process.

Figure 3:
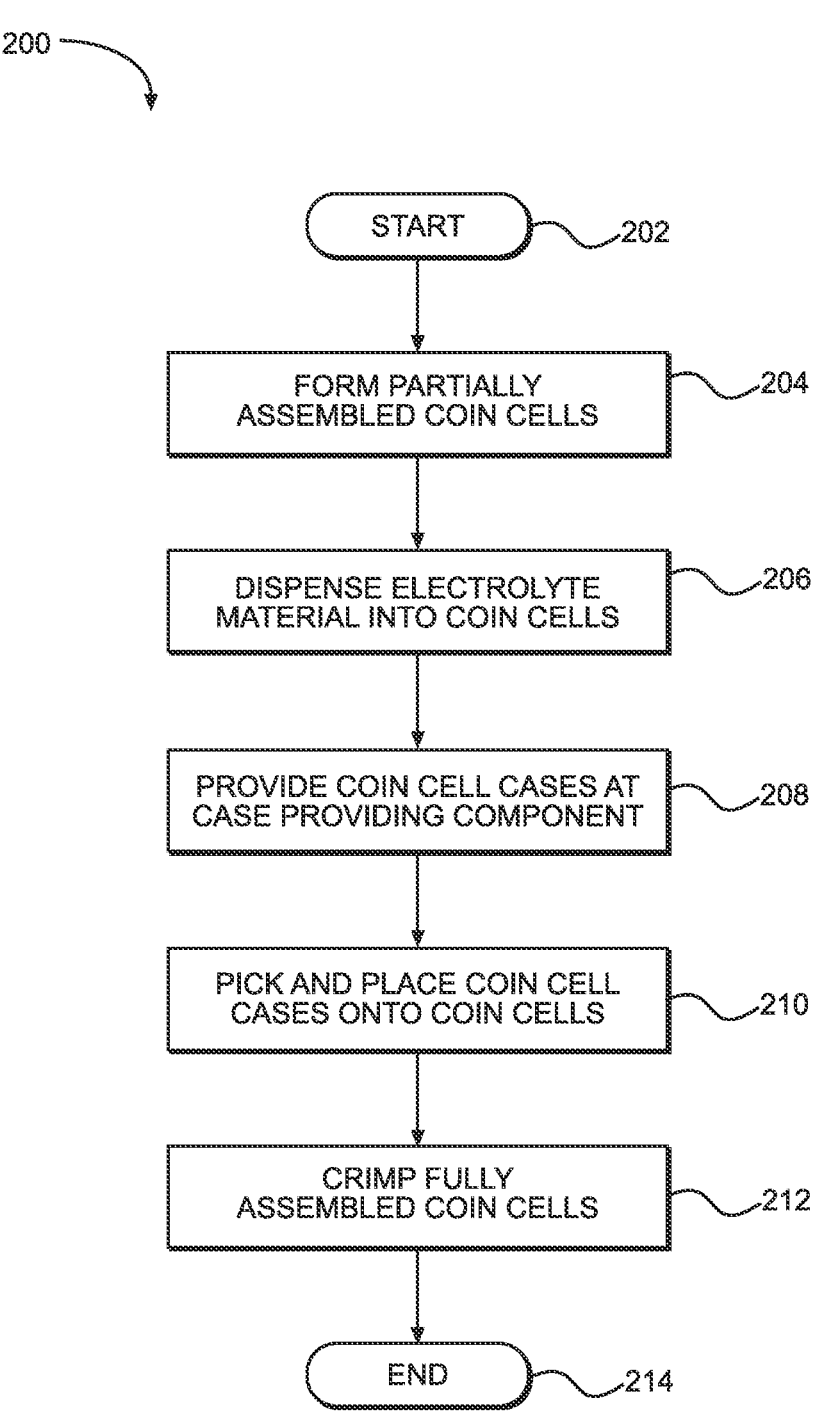
FIG. 3 illustrates a flowchart of an example summary method of manufacturing coin cell batteries according to one embodiment of the present disclosure.

Continuing with FIG. 3, a flowchart of an example summary method 200 of manufacturing coin cell batteries is provided. Summary method 200 can represent a broad overview of manufacturing coin cell batteries, and it will be understood that various other steps, features, and details of such a summary overview method are not provided here for purposes of simplicity. Some or all steps of summary method 200 can be performed automatically, After a start step 202, a first process step 204 can involve forming multiple partially assembled coin cells. This can be done using an automated pick and place component, for example, which can utilize one or more processors to automatically pick a coin cell cap and then place the picked coin cell cap into a well withing a holding arrangement. The automated pick and place component can then repeat this process for multiple internal parts within the coin cell cap to form a partially assembled coin cell, and these multiple processes can be repeated for each partially assembled coin cell within the holding arrangement. Alternatively, step 204 can be performed manually by one or more technicians or workers. Each of the multiple partially assembled coin cells can include at least one electrode and at least one spacer placed within a coin cell cap, among other possible items, and the compositions of these various components can vary from coin cell to coin cell in some arrangements. For example, a given partially assembled coin cell can include a coin cell cap, spring, spacer, first electrode, separator, and second electrode.

A subsequent process step 206 can involve dispensing electrolyte material into each of the multiple partially assembled coin cells. This can be done using an automated fluid handling robot, for example, which can utilize one or more processors to automatically dispense electrolyte materials of different compositions and/or volumes into each of the partially assembled coin cells within the holding arrangement. The electrolyte material can vary in amount and/or composition from coin cell to coin cell within the holding arrangement.

As a following process step 208, coin cell cases can be provided at a case providing component. This can be done using an automated case providing component, for example, with the case providing component being configured to store multiple coin cell cases and also being configured to automatically provide the stored coin cell cases at a receiving position. In some arrangements, this can involve storing the cases in a column and then utilize one or more processors to automatically move one case at a time from the column to the receiving position where the case can be picked. This automated movement of one case at a time can be repeated for as many coin cell cases are needed for the multiple partially assembled coin cells.

At the next process step 210, the coin cell cases can be picked and placed onto the partially assembled coin cells. This can be done using an automated pick and place component, for example, which can utilize one or more processors to automatically pick a coin cell case from the receiving position and then to automatically place the picked coin cell case onto a partially assembled coin cell within the holding arrangement to form a fully assembled coin cell. This automated picking and placing of one case at a time can also be repeated for as many coin cell cases are needed to convert the partially assembled coin cells to fully assembled coin cells.

At a subsequent process step 212, the fully assembled coin cells can be crimped. This can be done using an automated crimping component, for example, which can utilize one or more processors to crimp the fully assembled coin cells as they are placed within the automated crimping component. The method can then end at end step 214.

For the foregoing summary method 200, it will be appreciated that not all process steps are necessary, and that other process steps and details may be added. Furthermore, the order of steps may be altered in some cases, and some steps may be performed simultaneously. For example, steps 208 and 210 may be performed simultaneously in some arrangements. Other possible process steps and details are provided in further examples below, and variations and extrapolations of method 200 will also be readily appreciated by those of skill in the art.

Figure 4A:
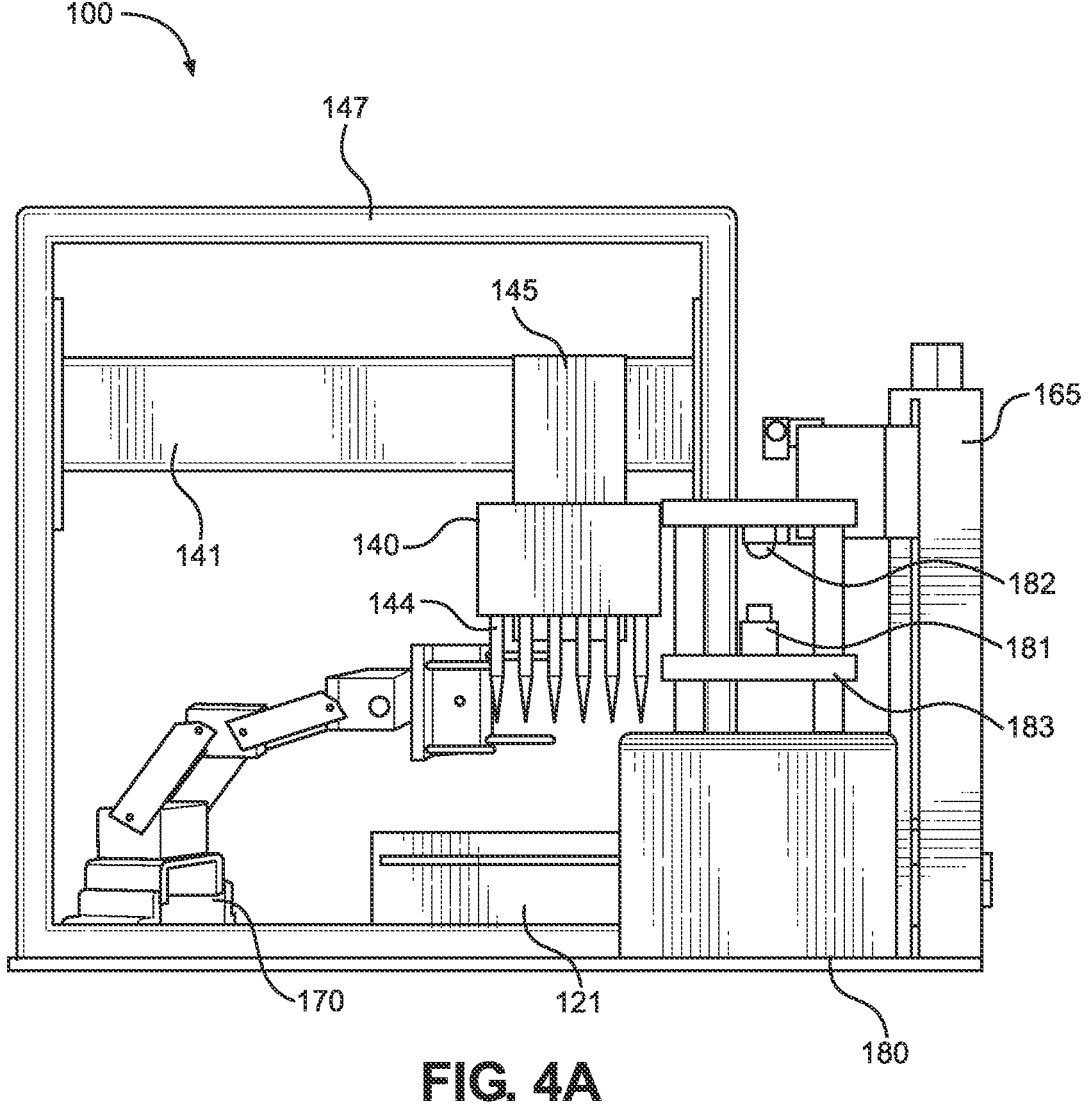
FIG. 4A illustrates in side elevation view components of an example automated coin cell battery manufacturing system according to one embodiment of the present disclosure.
Figures 4B, 4C:
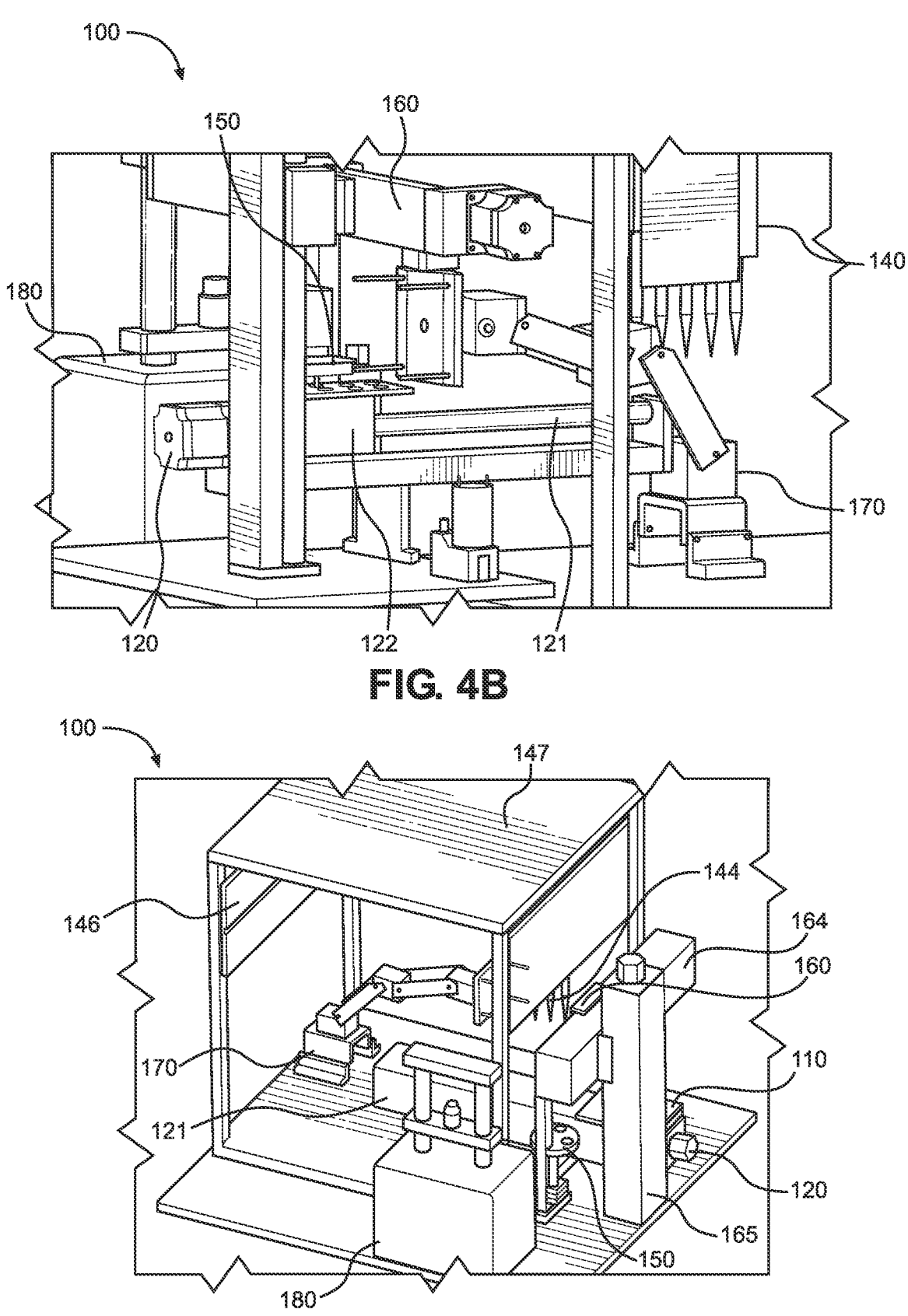
FIG. 4B illustrates in obverse side perspective view components of the automated coin cell battery manufacturing system of FIG. 4A according to one embodiment of the present disclosure.
FIG. 4C illustrates in top perspective view components of the automated coin cell battery manufacturing system of FIG. 4A according to one embodiment of the present disclosure.

Transitioning now to FIGS. 4A-C, various portions of an example automated coin cell battery manufacturing system are illustrated in side elevation, obverse side perspective, and top perspective views respectively. It will be appreciated that various portions and features of the overall system are not shown in each of FIGS. 4A-C for purposes of illustration, that all such portions and features can be included in a complete system, and that the relative locations of such portions and features can vary in a given system as may be desired. Again, automated coin cell battery manufacturing system 100 can include a holding arrangement 110, positioning component 120, electrolyte dispensing component 140, case providing component 150, pick and place component 160, flipping component 170, and crimping component 180, among other possible subsystems, components, and features.

In some arrangements, automated coin cell battery manufacturing system 100 can include three linear actuators driven by stepper motors and assembled at 90-degree angles from each other, which items can be used to simulate the three axes of a cartesian coordinate system. As noted above, holding arrangement 110 having wells for coin cells therein can travel along the x-axis of the system 100, such as by placing the holding arrangement atop a base that moves laterally along a track or rail 121, which movement can be facilitated by a linear actuator of positioning component 120, for example. System movements along a y-axis and a z-axis can be accounted for by other system components, such as electrolyte dispensing component 140 and pick and place component 160, as set forth in greater detail below. Alternatively, an independent multi-axis robotic arm can be used in place of a setup with multiple tracks and linear actuators.

After initial preparation of various coin cell parts to form partially assembled coin cells within holding arrangement 110, the x-axis linear actuator of positioning component 120 can move the holding arrangement to a first lateral position along track 121 that is suitable for dispensing electrolyte materials into the partially assembled coin cells. The liquid handling robot of electrolyte dispensing component 140 can then dispense variable electrolyte materials into each of the partially assembled coin cells in holding arrangement 110. Each coin cell can have different kinds of electrolytes, as well as different a volume of electrolyte material.

Electrolyte dispensing component 140 can have one or more pipettes 144 to dispense electrolyte material into the coin cells one at a time, and these can be robotically controlled along an x-axis track 141, z-axis track 145, and y-axis track 146, all of which can be contained within an outer housing or frame 147. In some arrangements, electrolyte dispensing system can be configured to automatically flush each pipette 144 with water or another inert fluid between drawing and dispensing different electrolyte materials into individual coin cells. After all electrolyte materials have been dispensed to the partially assembled coin cells, the overall system can actuate the linear actuation of positioning component 120 to move holding arrangement 110 from the first lateral position to a second lateral position along track 121, such as to be in a suitable position for placing coin cell cases atop the partially assembled coin cells.

While the first lateral position along track 121 can be proximate the liquid handing robot, the second lateral position can be proximate case providing component 150. Coin cell cases can be provided at receiving position on the case providing component 150 for pick and place component 160 to pick the cases and place them on the partially assembled coin cells within holding arrangement 110. To accomplish this, pick and place component 160 can include an end effector coupled to a robotic arm or other suitable moving component that can be operated along both a y-axis track 164 and a z-axis track 165, which can involve one track being mounted within the other. This can also be accomplished using computer controlled stepper motors that can rotate a ball screw, rack and pinion, and/or other suitable drive arrangements. Again, an independent multi-axis robotic arm can be used instead of a multiple track and stepper motor arrangements.

After picking and placing coin cells cases from case providing component 150 to close off fully assembled coin cells within holding arrangement 110, the coin cells can then be flipped over prior to crimping. This can be done by placing a top plate will corresponding wells over a bottom plate with wells holding the fully assembled coin cells. A suitable flipping component 170 can facilitate flipping over the combined plates prior to coin cell crimping. The flipping component can be, for example, an automated multi-axis robotic arm with custom design grippers with flipping capability, as set forth in greater detail below.

After plate flipping, the bottom plate can be removed, and the fully assembled coin cells can be placed into crimping component 180. Coin cells can again be moved for this purpose by pick and place component 160, which can place the coin cells one at a time into crimping component 180 to be crimped. Crimping component 180, which can be customized or modified to enable automated relay and/or remote control, can include a bottom die 181, a top die 182, and a moving platform 183 beneath bottom die 181 that pushes the dies together by way of a hydraulic press configured to compress the fully assembled coin cell together to crimp or otherwise seal the coin cell cap to the coin cell case.

Figure 5:
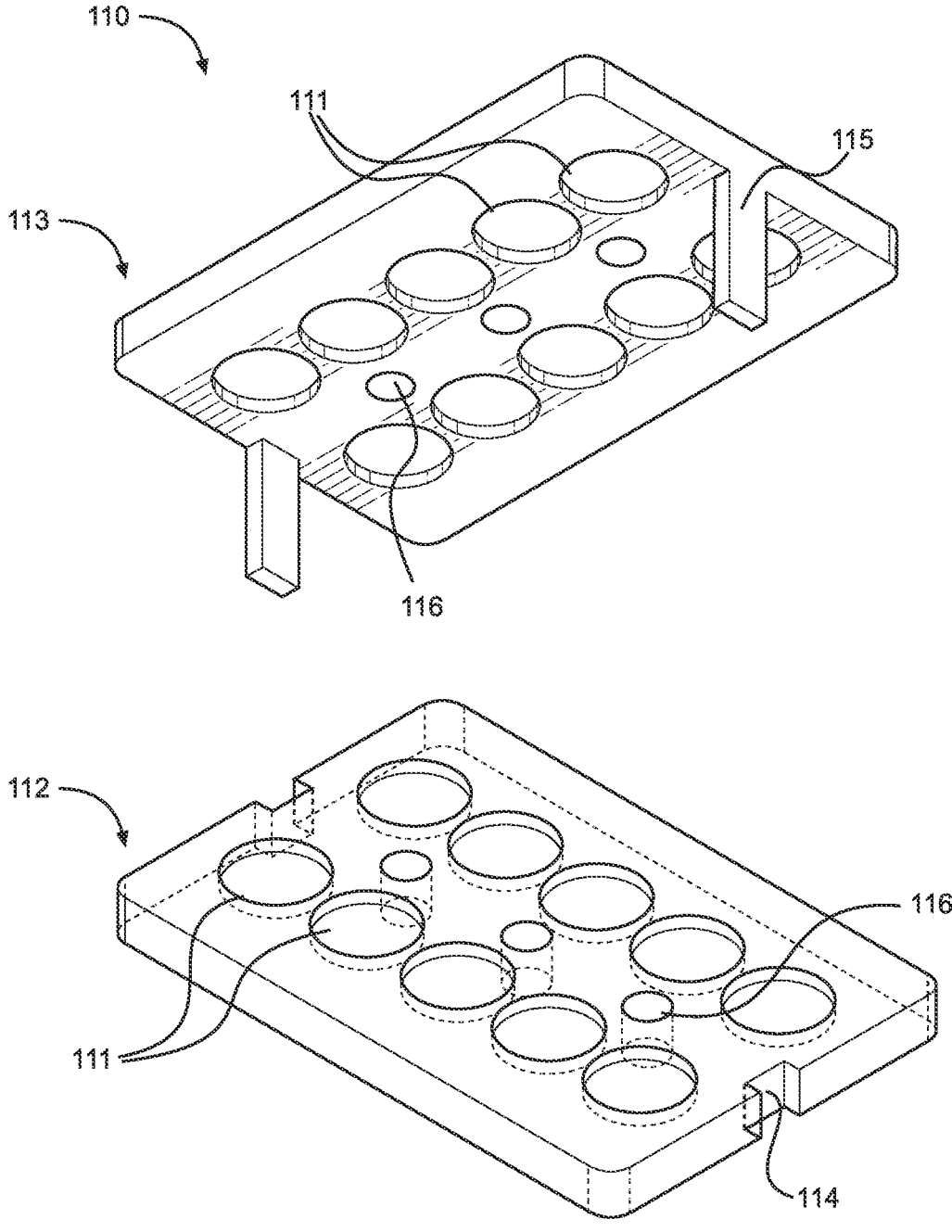
FIG. 5 illustrates in top perspective view an example holding arrangement for coin cells for an automated coin cell battery manufacturing system according to one embodiment of the present disclosure.

Turning next to FIG. 5 an example holding arrangement for multiple coin cells for an automated coin cell battery manufacturing system is shown in top perspective view. As noted above, holding arrangement 110 can include a bottom plate 112 and a top plate 113. Both plates 112, 113 can include multiple wells 111 formed therein that are suitably sized and shaped for the exact type of coin cells being formed. Bottom plate 112 can have relatively smaller wells 111 in which the anode caps of coin cells can fit snugly without moving, while top plate 113 can have relatively bigger wells in which the cathode cases of coin cells can fit snugly. The multiple wells 111 in both plates can be arranged into a matrix of rows and columns, such as the 2×5 matrices shown in FIG. 5. Of course, other amounts of wells 111 and other sizes and types of matrixes may alternatively be used for a given set of plates 112, 113 or other holding arrangement 110.

Both plates 112, 113 can include one or more mounting holes 116 therein, which mounting holes can serve to facilitate the removable mounting of each respective plate 112, 113 to a movable base that moves laterally along the x-axis within the overall system 100, as detailed above. For example, plates 112, 113 can each have three mounting holes 116 in the middle to mount to the movable base and to prevent movement and ensure accuracy when performing actions. In various arrangements, bottom plate 112 can be mounted to the movable base within overall system 100 and hold partially assembled coin cells therein during assembly of the coin cell components within the bottom plate, while top plate 113 can be mounted to the movable base and hold fully assembled coin cells therein during crimping and final placement processes.

Top plate 113 can be configured to be put together with bottom plate 112 while fully assembled coin cells are within the combined wells of both plates. When put together, a robotic arm or technician can flip over the set of combined plates 112, 113 without risking spills or coin cell disassembly. To facilitate a firmly aligned coupling of the plates, slots 114 along the outer edges of bottom plate 112 can be sized and dimensioned to receive protrusions 115 extending from top plate 113.

Figure 6:
FIG. 6 illustrates in side perspective view an example automated coin cell battery manufacturing system during the automated picking and placing of cases for coin cell batteries according to one embodiment of the present disclosure.
Figure 6:
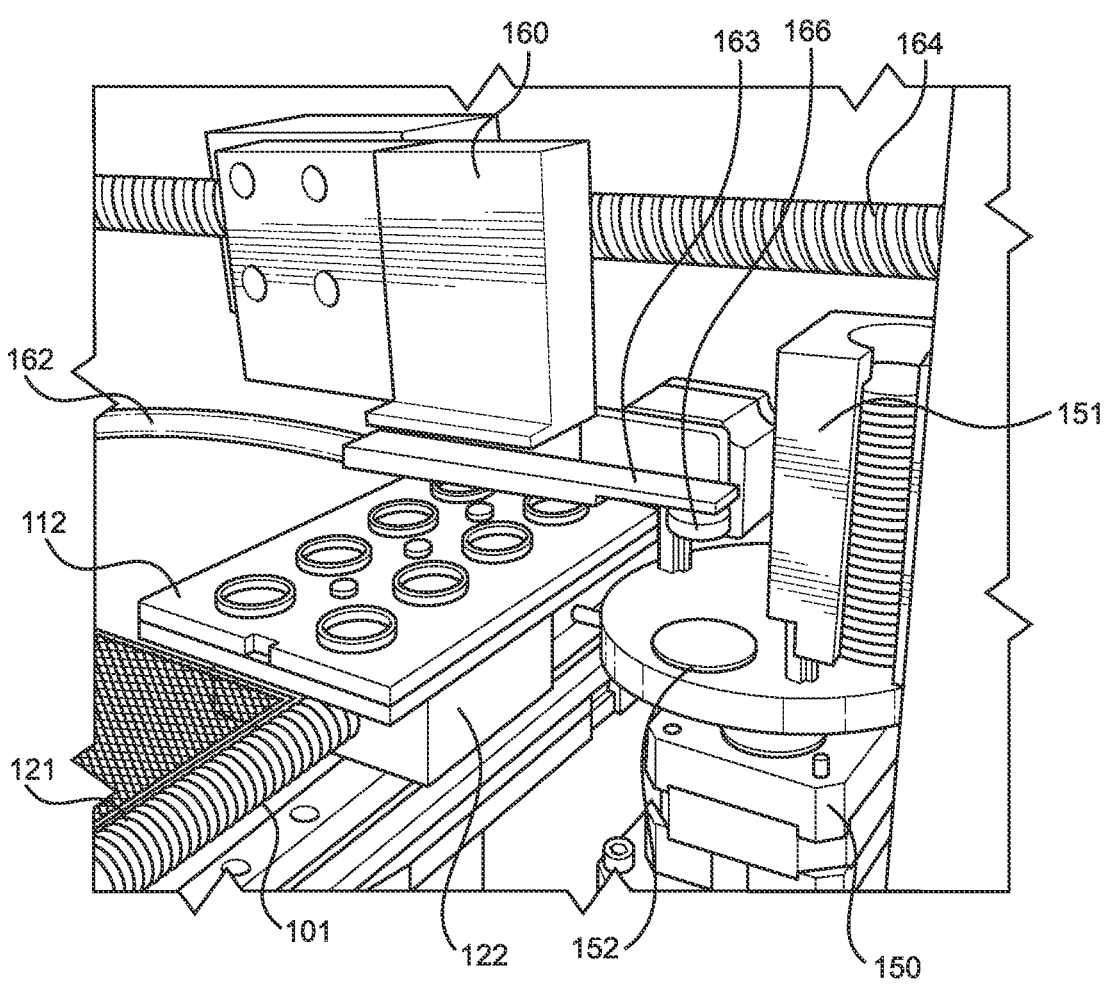

Continuing with FIG. 6 an example automated coin cell battery manufacturing system is shown in side perspective view during the automated picking and placing of cases for coin cell batteries. Automated coin cell battery manufacturing system 100 can include a bottom plate 112 or other holding arrangement component having multiple partially assembled coin cells 101 that are in the process of being manufactured. As shown, bottom plate 112 can be placed atop a movable base 122 at a lateral location along track or rail 121 that is conducive to the picking and placing of coin cell cases onto the partially assembled coin cells 101. Case providing component 150 can have multiple coin cell cases stored at storage region 151 and can provide these cases one at a time at receiving position 152. Pick and place component 160 can have an end effector 163 configured to move in multiple directions, such as along track or rail 164 in a lateral y-axis direction and along another track or rail (not shown) in a vertical z-axis direction, for example. Vacuum can be provided from a vacuum source through flexible vacuum tube 162 to end effector 163, which can have a flexible suction cup 166 or other suitable grabbing component. This suction cup 166, which can be made out of rubber, for example, can then be used to pick coin cell cases one at a time from receiving position 152 and place the picked coin cell cases atop the partially assembled coin cells 101.

Figure 7A:
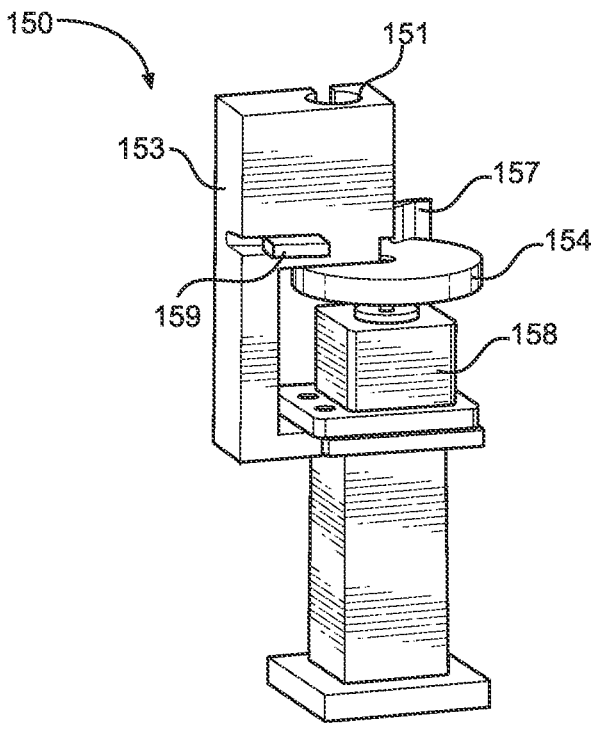
FIG. 7A illustrates in side elevation view an example case providing component for an automated coin cell battery manufacturing system according to one embodiment of the present disclosure.
Figure 7B:
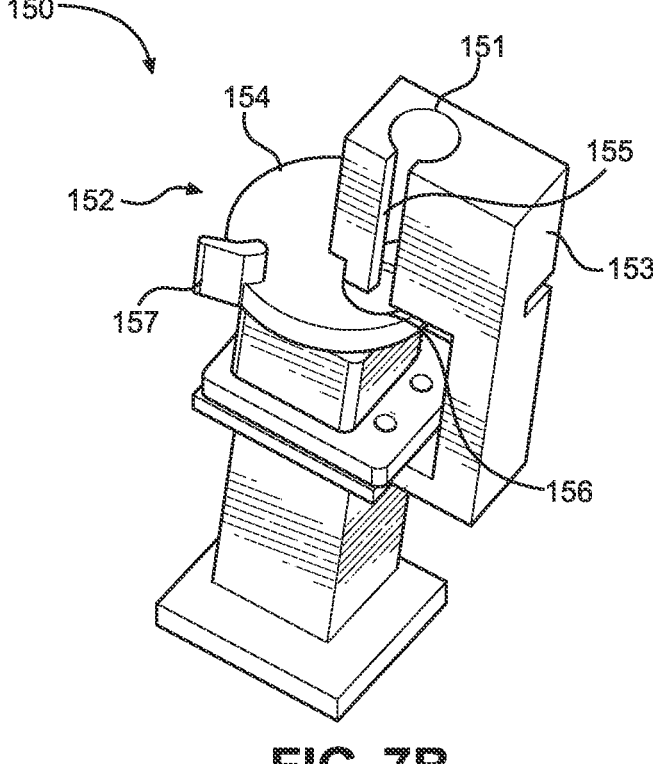
FIG. 7B illustrates in top perspective view the case providing component of FIG. 7A according to one embodiment of the present disclosure.

Moving next to FIGS. 7A and 7B an example case providing component for an automated coin cell battery manufacturing system is illustrated in side elevation view and top perspective views respectively. Case providing component 150 can include a storage region 151 located on a tower component 153 and a receiving position 152 that can be located with respect to a disk-shaped rotating component 154. Storage region 151 can be a vertically oriented column within tower component 153, and access slot 155 along storage region 151 can facilitate the loading of multiple coin cell cases within the storage region.

Recess 156 located on an upper surface of rotating component 154 can be sized and shaped to fit a single coin cell case therein. Rotating component 154 can be rotationally driven by a shaft coupled to rotational drive unit 158, which can include a rotational actuator controlled by a rotational stepper motor. This arrangement can allow rotating component 154 to be rotationally driven in both clockwise and counterclockwise directions. When disk or rotating component 154 rotates counterclockwise, recess 156 can align with storage region 151 and a coin cell case can then fall into the recess. Rotating component 154 can then rotate clockwise with the coin cell case in the recess 156 to receiving position 152. This then exposes the coin cell case and allows an associated end effector or other robotic component to pick up the coin cell case from the recess and place it at another location, such as atop a partially assembled coin cell. This process can be repeated one coin cell case at a time until all desired coin cells have cases placed thereupon.

Protrusion 157 located on rotating component 154 can operate in conjunction with sensor 159 located on tower component 153 to detect the rotational position of the rotating component when the protrusion contacts the sensor. Actuation of sensor 159 by protrusion 157 contacting the sensor can then result in feedback to the overall system, which can in turn stop or limit the amount of rotation of rotating component 154. The system can then also know the exact rotational position of rotating component 154 to be able to calibrate further movement of the rotating component in a counterclockwise direction.

Figure 7C:
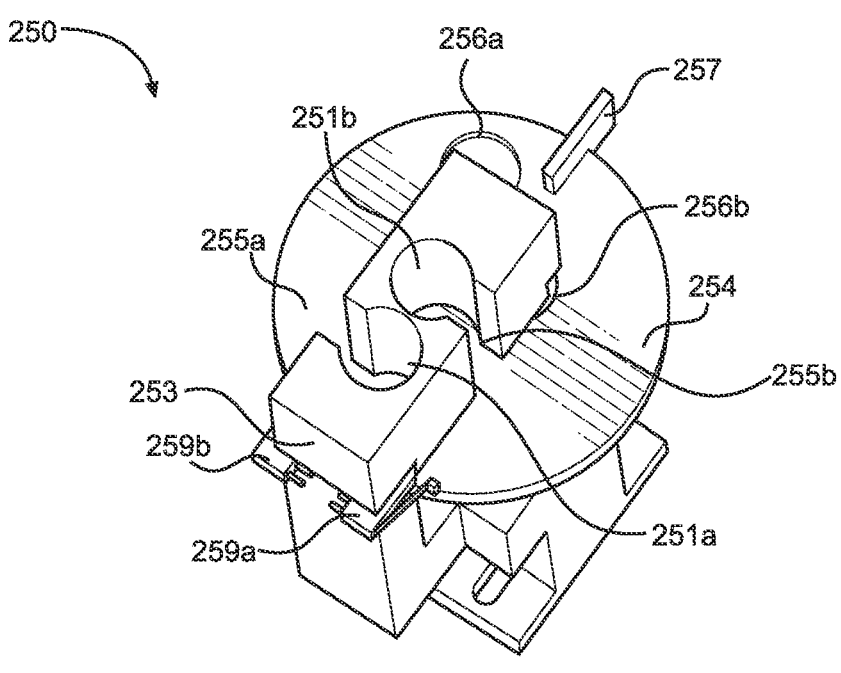
FIG. 7C illustrates in top perspective view an example alternative cap and case providing component for an automated coin cell battery manufacturing system according to one embodiment of the present disclosure.
Figure 7D:
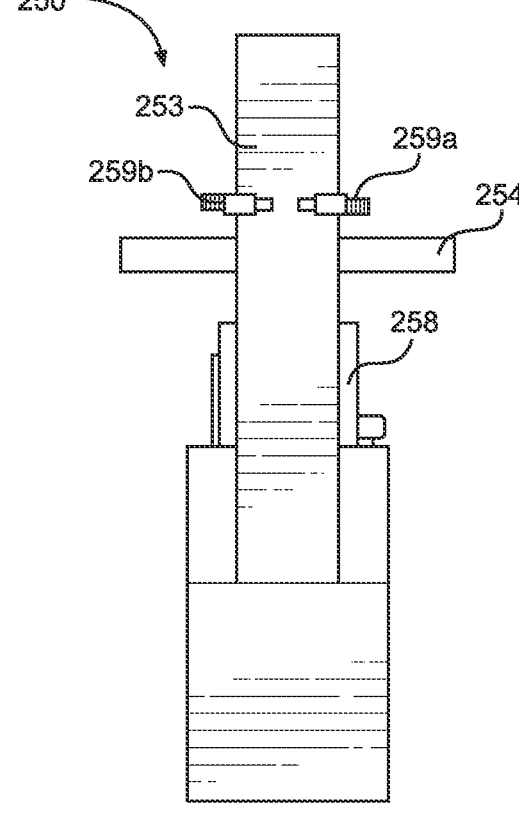
FIG. 7D illustrates in rear elevation view the alternative cap and case providing component of FIG. 7C according to one embodiment of the present disclosure.

Continuing with FIGS. 7C and 7D, an example alternative cap and case providing component for an automated coin cell battery manufacturing system is illustrated in top perspective and rear elevation views respectively. Cap and case providing component 250 can be similar to case providing component 150 above in that it stores and provides coin cell cases in automated fashion for the overall system. In addition, cap and case providing component 250 can similarly provide coin cell caps in automated fashion for the overall system. Cap and case providing component 250 can include case storage region 251*a* and cap storage region 251*b*, both of which can be located within tower component 253. Both of case storage region 251*a* and cap storage region 251*b* can be vertically oriented columns that can include respective access slots 255*a* and 255*b* to facilitate the loading of multiple coin cell cases and coin cell caps.

Disk-shaped rotating component 254 can include both case recess 256*a* and cap recess 256*b* on an upper surface thereof, with both recesses being sized and shaped to fit a single coin cell case and a single coin cell cap respectively. Similar to the foregoing embodiment, rotating component 254 can be rotationally driven by a shaft coupled to rotational drive unit 258, which can include a rotational actuator controlled by a rotational stepper motor. This arrangement can allow rotating component 254 to be rotationally driven in both clockwise and counterclockwise directions.

When rotating component 254 rotates counterclockwise, case recess 256*a* can align with case storage region 251*a* and a coin cell case can then fall into the case recess. Rotating component 254 can then rotate clockwise with the coin cell case in case recess 256*a* to a suitable receiving position to be picked. This then exposes the coin cell case and allows an associated end effector or other robotic component to pick up the coin cell case from case recess 256*a* and place it at another location, such as atop a partially assembled coin cell. This process can be repeated one coin cell case at a time until all desired coin cells have cases placed thereupon.

Similarly, when rotating component 254 rotates fully clockwise, cap recess 256*b* can align with cap storage region 251*b* and a coin cell cap can then fall into the cap recess. Rotating component 254 can then rotate counterclockwise with the coin cell cap in cap recess 256*b* to a suitable receiving position to be picked. This then exposes the coin cell cap and allows an associated end effector or other robotic component to pick up the coin cell cap from cap recess 256*b* and place it at another location, such as within a holding arrangement to being formation of a partially assembled coin cell. This process can be repeated one coin cell cap at a time until all desired wells within a holding arrangement have caps placed therein.

Protrusion 257 located on rotating component 254 can operate in conjunction with sensors 259*a* and 259*b* located on tower component 253 to detect the rotational position of the rotating component when the protrusion contacts one of the sensors. Actuation of one of sensors 259*a* or 259*b* by protrusion 257 contacting the sensor can then result in feedback to the overall system, which can in turn stop or limit the amount of rotation of rotating component 254. The system can then also know the exact rotational position of rotating component 254 to be able to calibrate further movement of the rotating component in another direction.

As will be readily appreciated, cap and case providing component 250 can be operated such that coin cell caps are provided first and then coin cell cases are provided later. In some arrangements, all coin cell caps can be provided into some or all of the wells of an associated holding arrangement, after which internal parts and electrolytes are provided into the coin cell caps to form partially assembled coin cells, after which all coin cell cases are then provided atop all of the partially assembled coin cells. In other arrangements, individual coin cells can be formed one at a time within the wells, such that a coin cell cap is provided within one well, internal parts are then provided within that coin cell cap, electrolyte is then provided atop the internal parts, and a coin cell case is then provided atop the partially assembled coin cell. This process can then be repeated for each well where formation of a separate coin cell is desired. Other arrangements and processes are also possible.

Figure 7E:
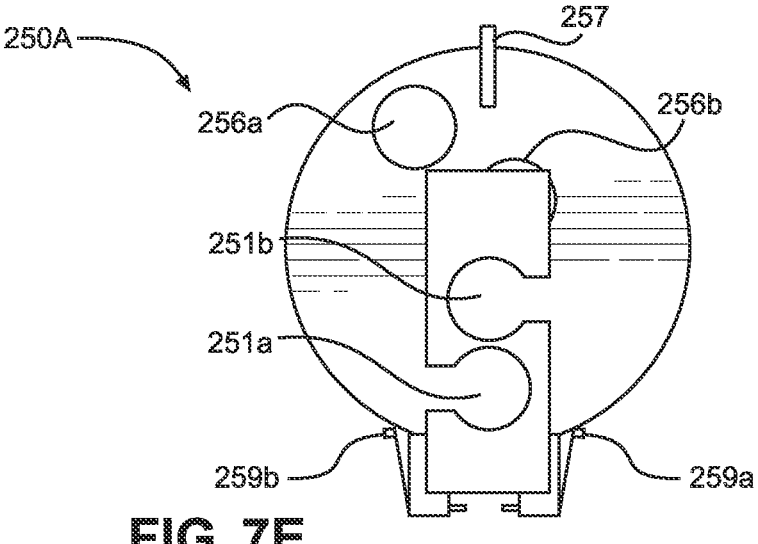
FIG. 7E illustrates in top plan view the alternative cap and case providing component of FIG. 7C at a providing position according to one embodiment of the present disclosure.
Figure 7F:
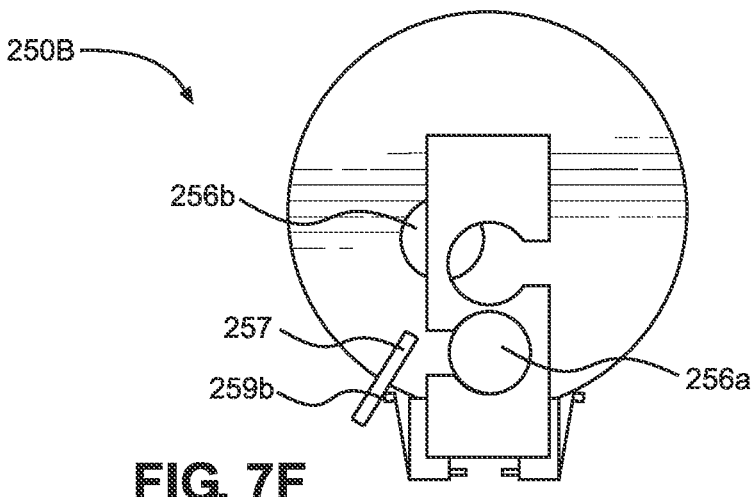
FIG. 7F illustrates in top plan view the alternative cap and case providing component of FIG. 7C at a first loading position according to one embodiment of the present disclosure.
Figure 7G:
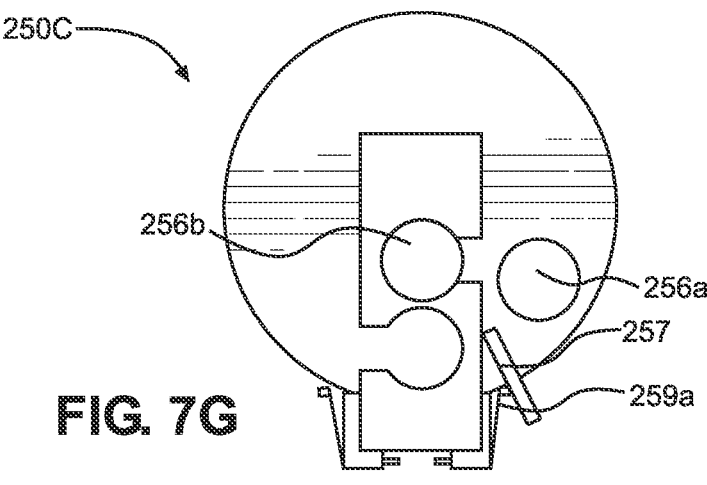
FIG. 7G illustrates in top plan view the alternative cap and case providing component of FIG. 7C at a second loading position according to one embodiment of the present disclosure.

FIGS. 7E through 7G illustrate in top plan views the alternative cap and case providing component of FIG. 7C at providing, first loading, and second loading positions respectively. Providing position 250A of FIG. 7E depicts a possible rotational position of rotating component 254 for providing a coin cell case to be picked from case recess 256*a*. First loading position 250B of FIG. 7F depicts a rotational position of rotating component 254 for loading a coin cell case from case storage region 251*a* into case recess 256*a*. This rotational position can coincide with protrusion 257 contacting sensor 259*b*, for example. Second loading position 250C of FIG. 7G depicts a rotational position of rotating component 254 for loading a coin cell cap from cap storage region 251*b* into cap recess 256*b*. This rotational position can coincide with protrusion 257 contacting sensor 259*a*, for example. A further rotational position of rotational component 254 (not shown) may be designated for providing coin cell caps to be picked from cap recess 256*b*, as will be readily appreciated.

Figure 8A:
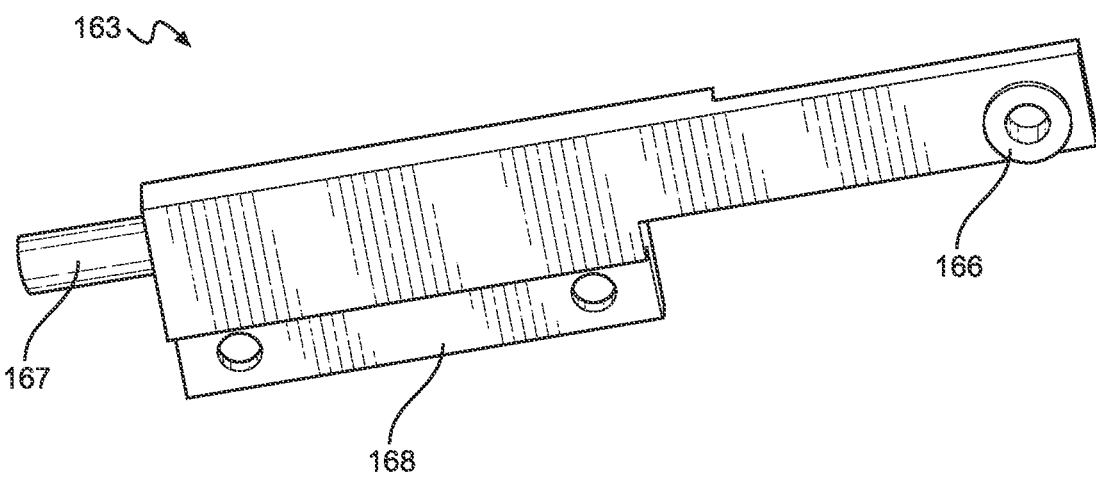
FIG. 8A illustrates in bottom perspective view an example end effector of a pick and place component for an automated coin cell battery manufacturing system according to one embodiment of the present disclosure.
Figure 8B:
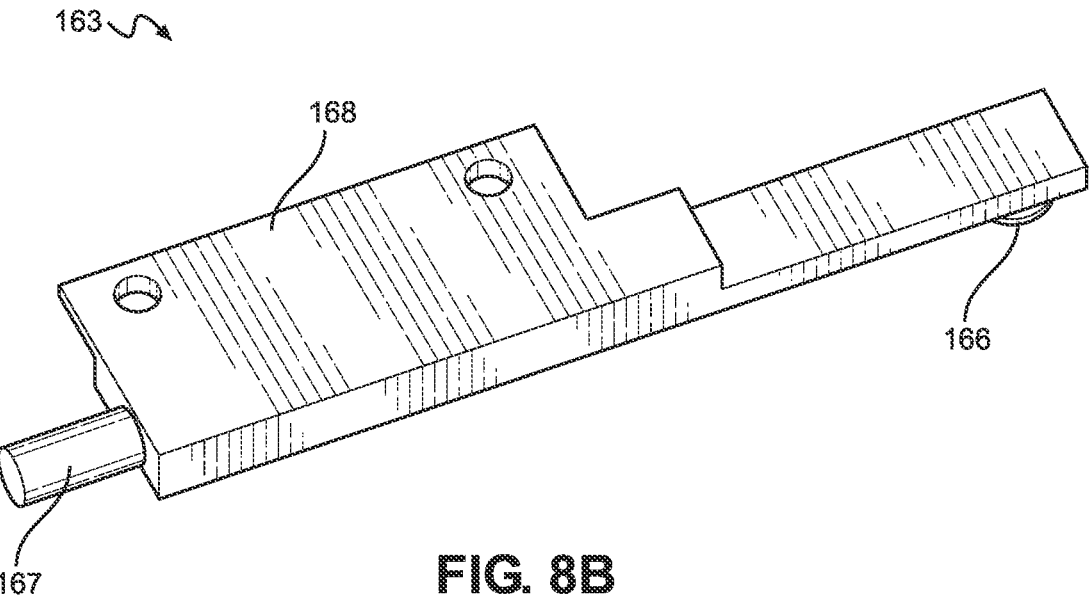
FIG. 8B illustrates in top perspective view the end effector of FIG. 8A according to one embodiment of the present disclosure.

Moving next to FIGS. 8A and 8B, an example end effector of a pick and place component for an automated coin cell battery manufacturing system is depicted in bottom perspective and top perspective views respectively. As noted above, end effector 163 can be specially designed to couple to and operate with a robotic arm that is able to move in multiple directions, such as along a y-axis and z-axis. In various arrangements, end effector 163 can be capable of picking up and placing coin cell cases, entire coin cells, and other associated coin cell parts and items as may be desired.

End effector 163 can include an elongated hollow metal (or other suitable material) piece with a rubber tip or suction cup 166 coupled to one end. The other end of end effector 163 can include a vacuum interface 167 that can couple to a flexible plastic tube or other suitable conduit to a vacuum pump. When the vacuum pump is turned on, air can be sucked from within the tube and the hollow portion of end effector 163 such that a vacuum is delivered to rubber tip or suction cup 166. When suction cup 166 is in contact with another surface such as a coin cell case or fully assembled coin cell, this then creates a vacuum seal with the other surface and facilitates the ready picking and lifting of the item suction cup 166 is contacting.

End effector 163 can also include a flange 168 having one or more holes or other coupling features to facilitate attachment or coupling of the end effector with an associated robotic arm that can move in multiple directions. It will be readily appreciated that controlling the movements of the robotic arm (and coupled end effector 163) and controlling the application and release of vacuum to suction cup 166 can then provide a reliable mechanism for picking and placing components such as coin cell caps, internal parts, and cases, as well as fully assembled coin cells and fully assembled and crimped coin cells.

Transitioning now to FIG. 9A, an example flipping component for an automated coin cell battery manufacturing system is illustrated in side perspective view. As shown, flipping component 170 can be automatically moved to a position 170A where it is gripping a bottom plate 112 of a holding arrangement on a movable base 122. Flipping component 170 can include various robotic arms and grippers to facilitate the flipping or turning upside down of fully assembled coin cells prior to crimping. Such flipping of fully assembled coin cells can provide a better alignment of internal parts within the coin cells and can also help with later picking and placing of the assembled and crimped coin cells. In addition, flipping the fully assembled coin cells can put them in the proper upright orientation for later picking and placing into crimping component 180 for crimping.

Figures 9D, 9E, 9F:
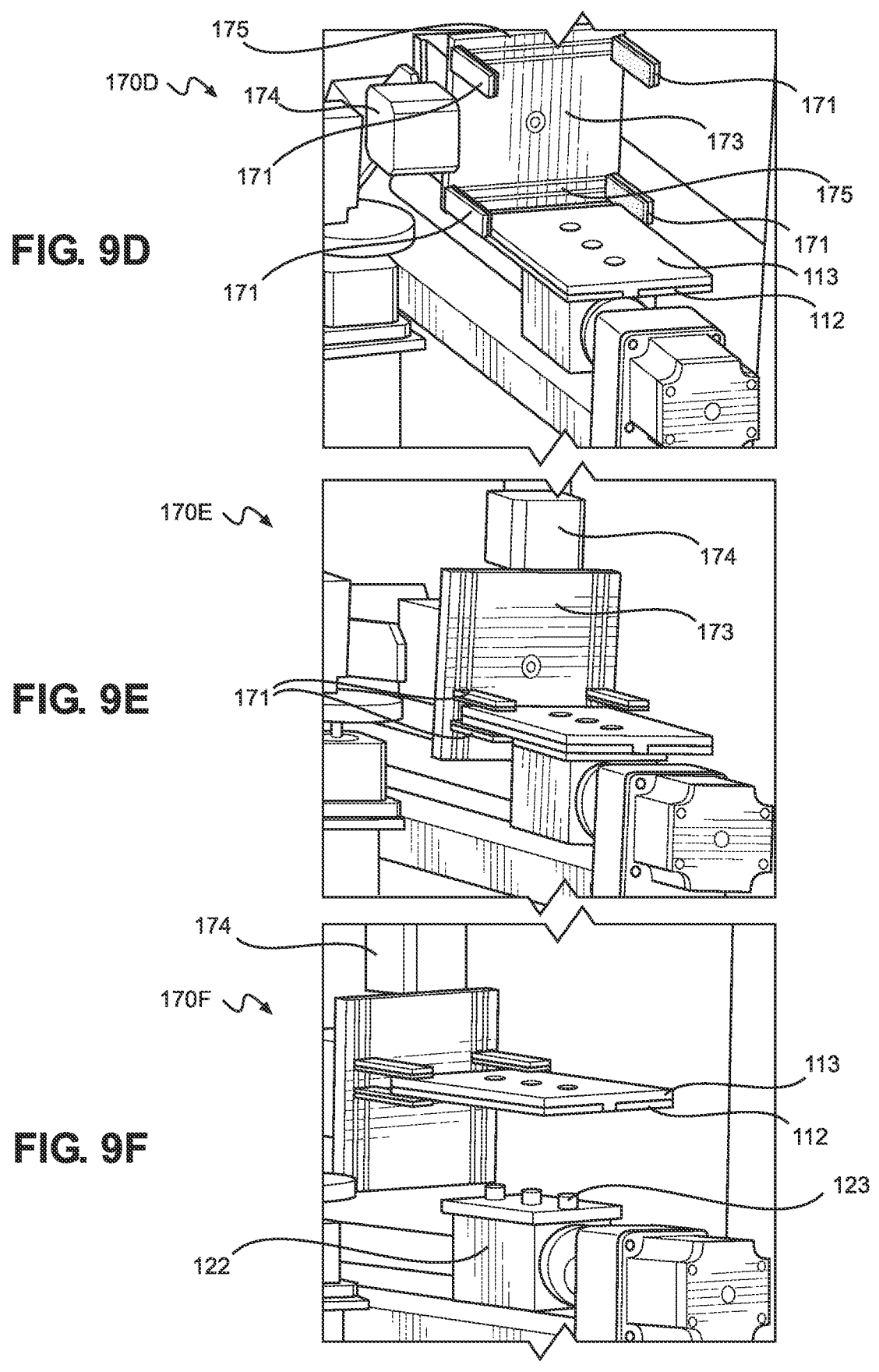
Figures 9G, 9H, 9I:
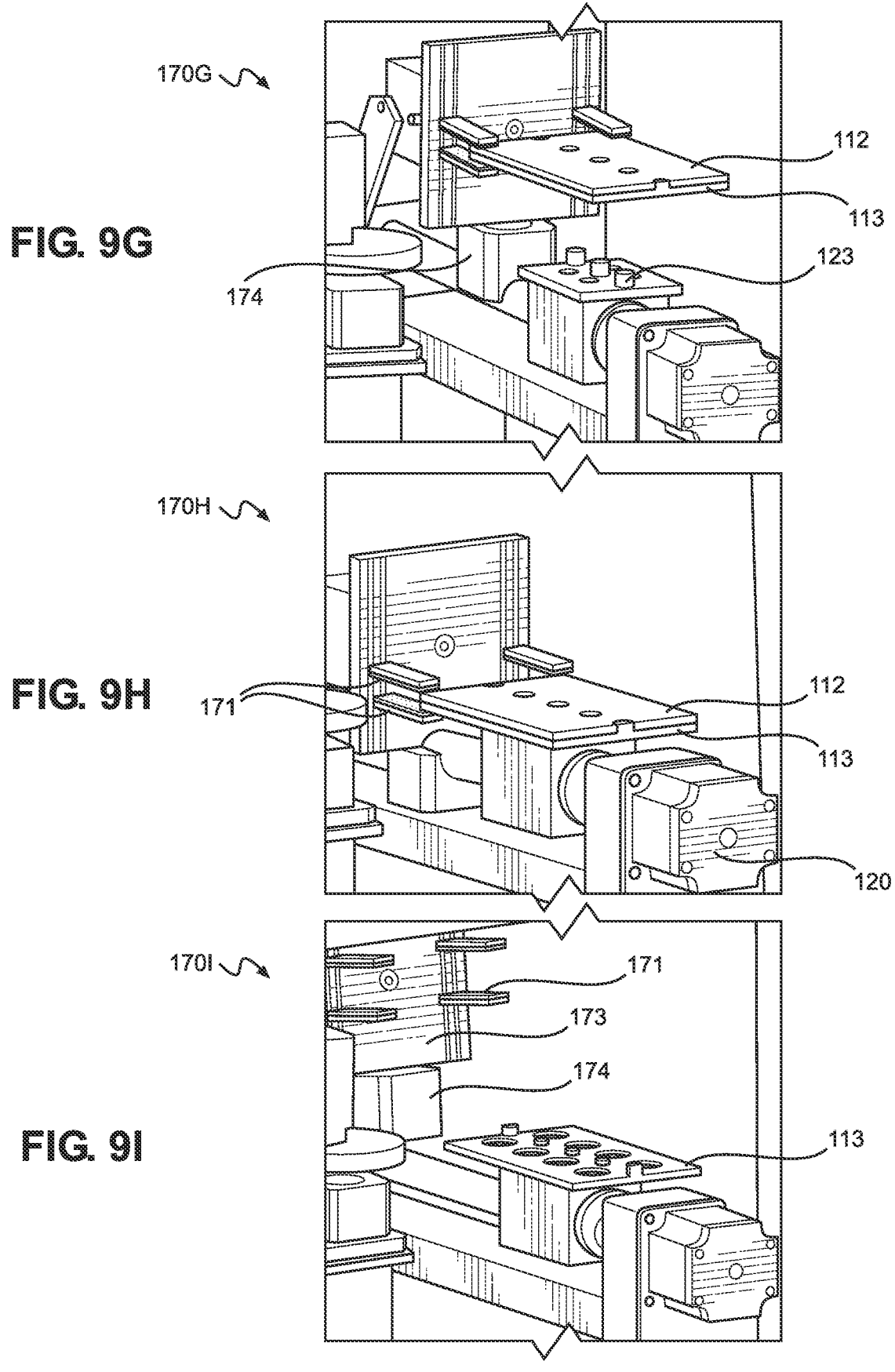
FIG. 9G illustrates in front perspective view the flipping component of FIG. 9A flipping over the top plate and bottom plate together according to one embodiment of the present disclosure.
FIG. 9H illustrates in front perspective view the flipping component of FIG. 9A placing the bottom plate and top plate together onto the movable base according to one embodiment of the present disclosure.
FIG. 9I illustrates in front perspective view the flipping component of FIG. 9A removing the bottom plate from the top plate according to one embodiment of the present disclosure.

Flipping component 170 can include one or more gripping components 171 and one or more robotic arms 172, which can be, for example, a multi-axis robotic arm, which components can combine to move and flip over a holding arrangement, such as a multiple plate arrangement. In some arrangements, gripping components 171 can be L-shaped, as shown in FIG. 9A. In other arrangements, gripping components 171 can instead be flat, as shown in FIGS. 9B-9I below. Either gripping component shape can be used, and other shapes are also possible.

FIGS. 9B and 9C show the flipping component of FIG. 9A gripping a top plate of a holding arrangement in side perspective and front perspective views respectively. As shown at positions 170B and 170C (which can be the same position from different perspectives), two gripping components 171 extending from rotational base 173 can be moved automatically to pinch and hold top plate 113 therebetween. The flipping component can then be automatically moved such that top plate 113 is positioned directly above bottom plate 112, which can hold multiple fully assembled coin cells in wells therewithin. Bottom plate 112 can be mounted atop movable base 122, which can be positioned laterally near positioning component 120. A rotational motor 174 can be located along one side of rotational base 173 and can be configured to rotate the rotational base, as shown in further positions below.

FIGS. 9D through 9I then depict in front perspective views various stages of the plate flipping process. At position 170D of FIG. 9D, the flipping component can manipulate the location of top plate 113 such that it is placed atop bottom plate 112. This can be done by moving the one or more robotic arms 172 (shown in FIG. 9A above) such that rotational base 173 is suitably moved to place top plate 113 as shown. The two gripping components 171 that are pinching together or otherwise holding top plate 113 can then be moved to release the top plate. This can involve lateral movement of these gripping components 171 along a respective track 175, which can be controlled by an associated stepper motor and processor, for example.

The flipping component can then be further manipulated to arrive at position 170E of FIG. 9E. This can involve rotating rotational base 173 by a quarter turn (i.e., 90 degrees), which can be done by way of rotational motor 174, which can itself then move from a side location to a top location with respect to rotational base 173, as shown. The robotic arms can then be moved such that two of gripping components 171 are located above top plate 113 and the other two of gripping components 171 are located below bottom plate 112. Gripping components 171 can then be moved along their respective tracks 175 until all of the gripping components squeeze or grip together the top plate 113 and bottom plate 112, as shown.

To arrive at position 170F of FIG. 9F, the flipping component can then be moved or manipulated to lift the combined top plate 113 and bottom plate 112 (i.e., holding arrangement) off from movable base 122. This can involve moving the robotic arms 172 (as shown above) to move rotational base 173 upward and/or moving all of the gripping components 171 upward along their respective tracks 175 to lift the plates upward. This can expose multiple mounting posts 123 located on movable base 122, which can be configured to insert into the mounting holes of both of bottom plate 112 and top plate 113.

The entire arrangement can then be flipped as shown at position 170G of FIG. 9G. This can involve rotating rotational base by one half turn (i.e., 180 degrees), which can be accomplished by way of rotational motor 174, which can itself then move from a top location to a bottom location with respect to rotational base 173. As shown, this flipping action can result in bottom plate 112 being atop top plate 113, with all coin cells located between the two plates being similarly flipped.

To arrive at position 170H of FIG. 9H, the flipping component can then be moved or manipulated to place the combined bottom plate 112 and top plate 113 arrangement back onto movable base 122. This can involve moving the robotic arms 172 (as shown above) to move rotational base 173 downward and/or moving all of the gripping components downward along their respective tracks to move the plates downward and onto the mounting posts of the movable base, as will be readily appreciated.

Finally, to arrive at position 170I of FIG. 9I, bottom plate 112 can be removed from top plate 113. This can involve releasing the plates from the combined grip of all four gripping components 171 and then using the gripping components only to grip bottom plate 112 and lift it away from top plate 113, which is then exposed while atop the movable base. As will be readily appreciated, this can involve a similar process to that which is shown with respect to the placement of top plate 113 in FIGS. 9C and 9D, only in reverse in removing bottom plate 112. The flipped or upside-down fully assembled coin cells can then be picked and placed from top plate 113, such as for crimping and final delivery purposes. In some arrangements, a plate hotel can be used to store multiple plates, and the flipping component can also be configured to move plates in and out of the plate hotel for active use within the overall system.

Figure 10:
FIG. 10 illustrates a flowchart of an example method of flipping a holding arrangement of coin cell batteries according to one embodiment of the present disclosure.
Figure 10:
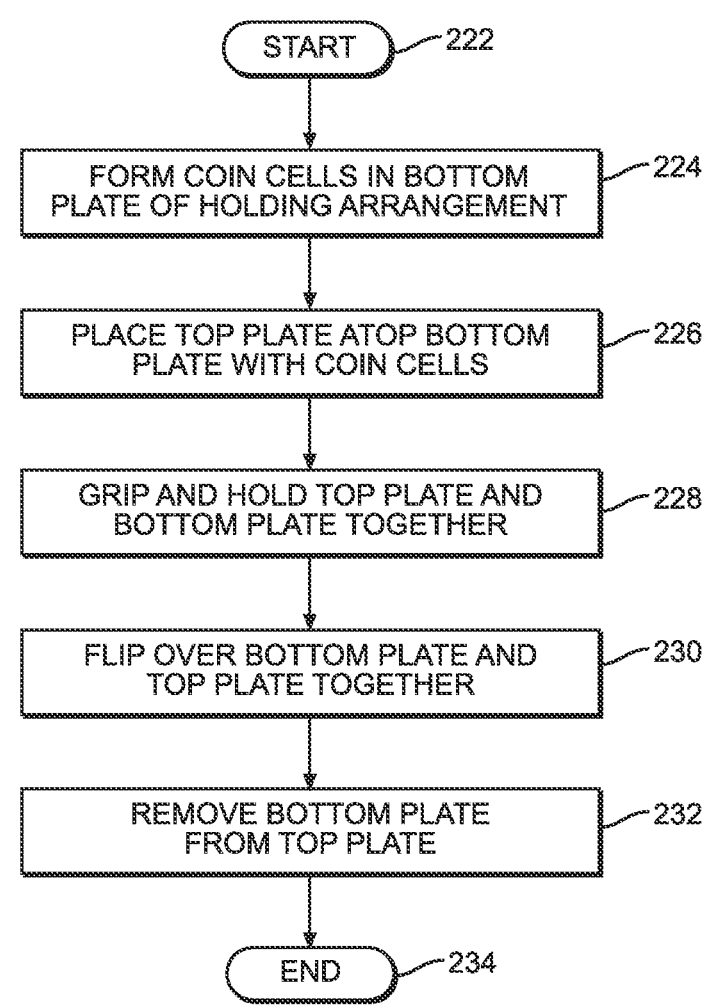

Continuing with FIG. 10, a flowchart of an example method of flipping a holding arrangement of coin cell batteries is provided. Method 220 can represent a subset of an overall method of manufacturing coin cell batteries and can be a detailed breakdown of step 318 in method 300 below, for example. After a start step 222, a first process step 224 can involve forming coin cells within a bottom plate of a holding arrangement. Step 224 can involve a manual or fully automated process, and details for such a process are provided above.

At a following process step 226, a top plate of a holding arrangement can be placed atop the bottom plate holding the coin cells formed in wells thereof. This step can be performed automatically using a flipping component, such as by that which is shown and described with respect to FIGS. 9C and 9D above, for example.

At subsequent process step 228, the top plate and bottom plate can be gripped and held together. This step can be performed automatically using a flipping component, such as by that which is shown and described with respect to FIG. 9E above, for example.

At the next process step 230, the top plate and bottom plate can be flipped over together. This can take place while they are being gripped and held together, such as by that which is shown and described with respect to FIGS. 9F and 9G above.

At a following process step 232, the bottom plate can be removed from the top plate. This can result in the formed coin cells being flipped and exposed within the wells of the top plate. This can also be performed automatically using a flipping component, such as by that which is shown and described with respect to FIG. 9I above, for example. The method can then end at end step 234.

For the foregoing method 220, it will be appreciated that not all process steps are necessary, and that other process steps and details may be added. Furthermore, the order of steps may be altered in some cases, and some steps may be performed simultaneously. For example, steps 228 and 230 may be performed simultaneously in some arrangements. Other possible process steps can include lifting the top and bottom plate together from a base component before flipping and setting them back down together onto the base component after flipping. Variations and extrapolations of method 220 will also be readily appreciated by those of skill in the art.

Figure 11:
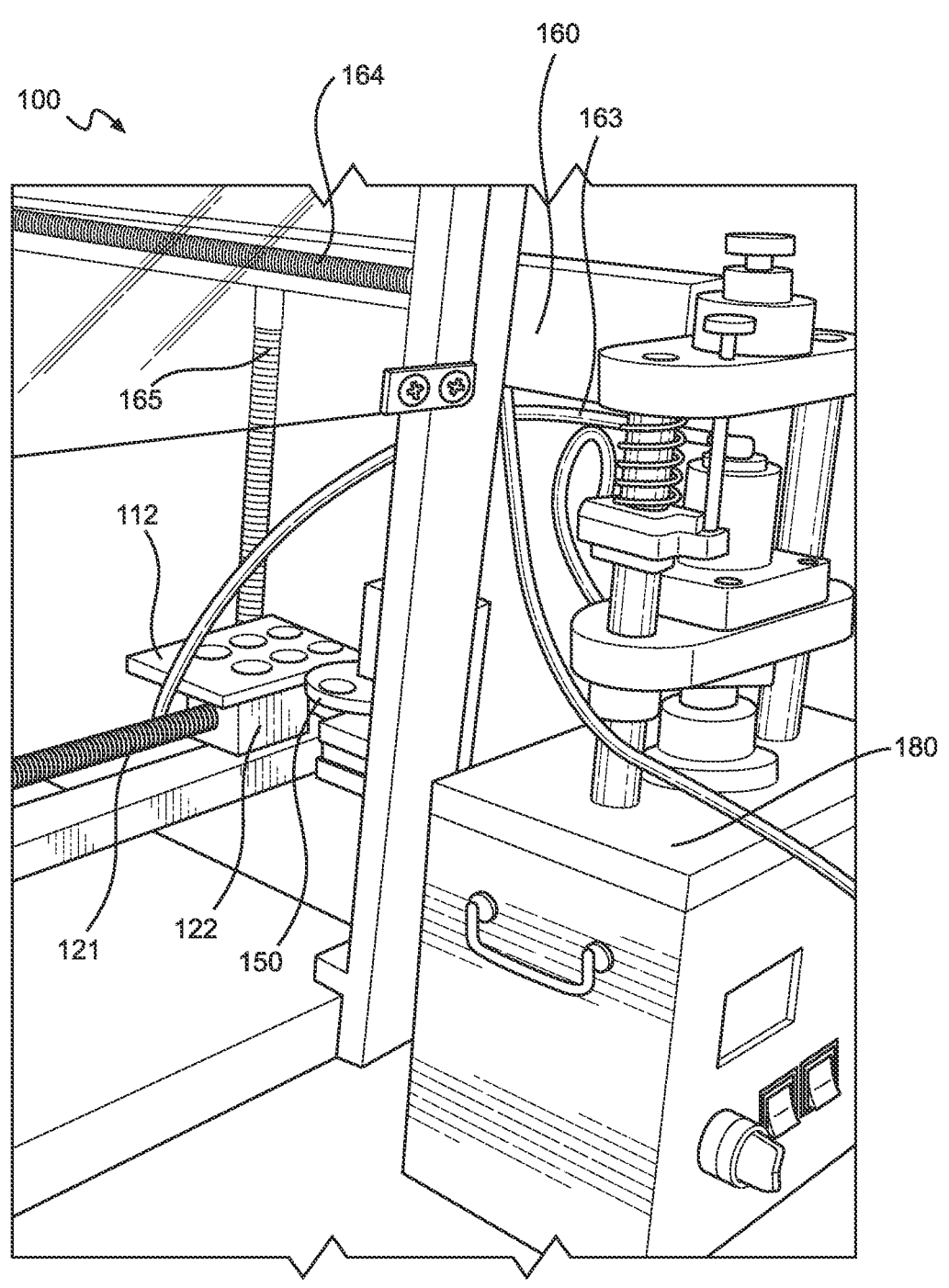
FIG. 11 illustrates in side perspective view an example automated coin cell battery manufacturing system during the automated crimping of fully assembled coin cell batteries according to one embodiment of the present disclosure.

Moving next to FIG. 11, an example automated coin cell battery manufacturing system is shown in side perspective view during the automated crimping of fully assembled coin cell batteries. Automated coin cell battery manufacturing system 100 can include a holding arrangement component such as a bottom plate 113 having multiple fully assembled coin cells that are in the process of being manufactured and are ready for crimping. As shown, top plate 113 can be placed atop a movable base 122 that can be at a lateral location along an x-axis oriented track or rail 121 that is conducive to the picking and placing of coin cells proximate crimping component 180. This lateral location can be different than the lateral location for coin cell case placement, which can in turn be different than the lateral location for electrolyte dispensing, among other possible lateral locations along track or rail 121.

Again, a pick and place component 160 can have an end effector 163 configured to move in multiple directions, such as along track or rail 164 in a y-axis direction and along another track or rail 165 in a z-axis direction, or freely within three-dimensional space mounted on a multi-axis robotic arm. Vacuum can be provided to the end effector 163, which can have a flexible suction cup or other suitable grabbing component that can be used to pick fully assembled coin cells one at a time from top plate 113 to be placed within crimping component 180. As will be readily appreciated, the automated crimping process can put pressure on the fully assembled coin cells to seal them, such as by deforming or pressing the coin cell case into the con cell cap, or vice-versa. The crimped coin cells can then be picked from the crimping component 180 and placed to a final location, which can be top plate 113 or other suitable component of the holding arrangement.

Figure 12:
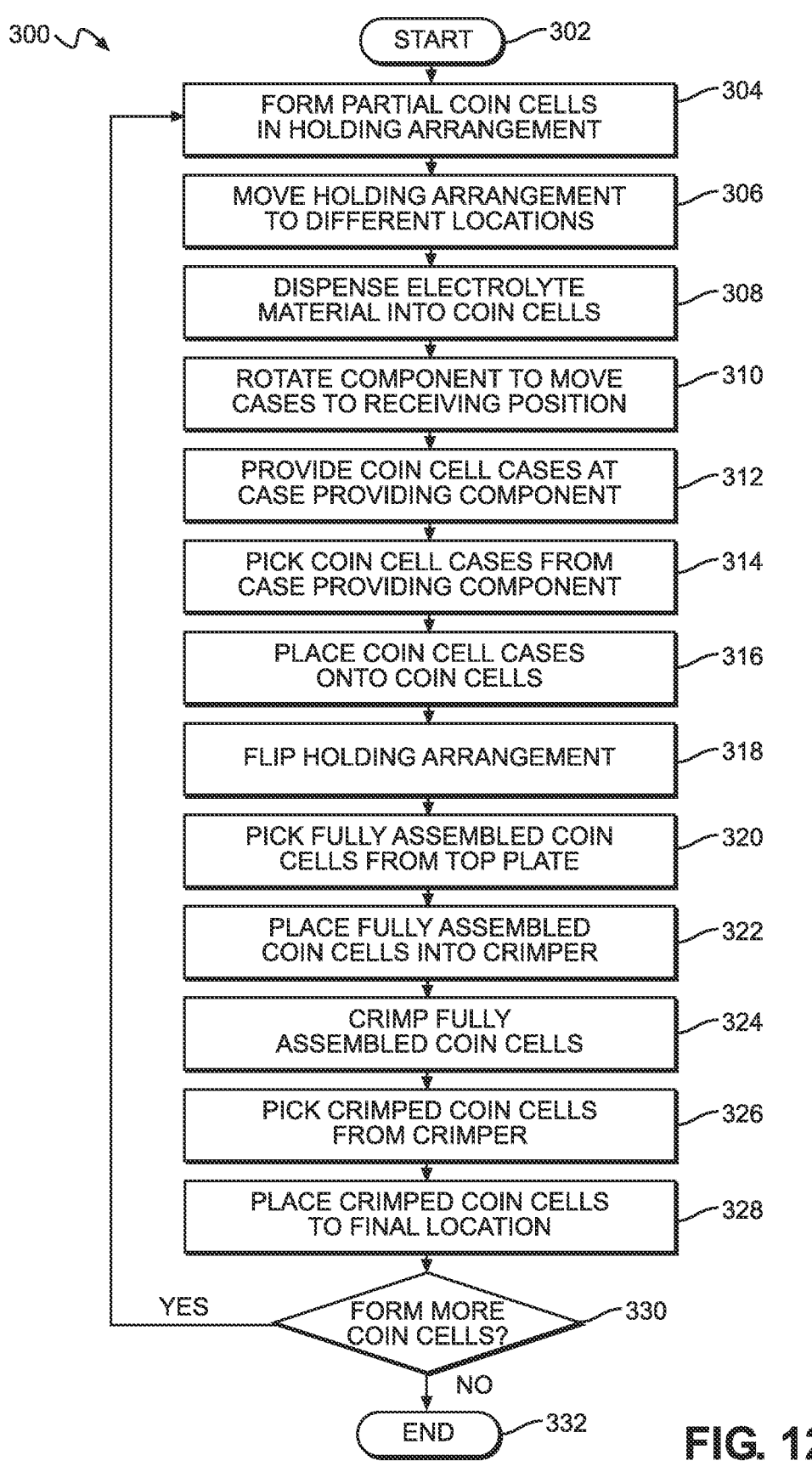
FIG. 12 illustrates a flowchart of an example detailed method of manufacturing coin cell batteries with various automated system components according to one embodiment of the present disclosure.

Lastly, FIG. 12 provides a flowchart of an example detailed method 300 of manufacturing coin cell batteries with various automated system components. Detailed method 300 can represent a more thorough method of manufacturing coin cell batteries than summary method 200 above. After a start step 302, a first process step 304 can involve forming multiple partially assembled coin cells within a holding arrangement. Such a holding arrangement can include a bottom plate having wells to hold the partially assembled coin cells, as noted above. The partially assembled coin cells can be formed by way of an automated process, or can be formed manually, or can be formed by a combination of automated and manual steps. Any automated formation can be facilitated automatically by way of a processing component.

At a following process step 306, the bottom plate or other holding arrangement can be moved to different locations. Such movement to different locations can be along an x-axis of the holding arrangement and can be done to facilitate functions or other step activities on a cell by cell basis. Such movement can be facilitated automatically by way of a processing component.

At the next process step 308, electrolyte material can be dispensed into the partially assembled coin cells. This can be done by a liquid handling robot, as noted above, and the electrolyte material can vary by composition and volume for different partially assembled coin cells. Such dispensing can be facilitated automatically by way of a processing component.

At subsequent process step 310, a rotating component of a case providing component can be rotated to move a single coin cell case from the bottom of a column of stored coin cell cases to a receiving position to be picked from the case providing component. Such rotating can be facilitated automatically by way of a processing component.

At a following process step 312, coin cell cases can be provided at the case providing component, which again can be configured to store multiple coin cell cases. This can be accomplished simply by rotating the rotating component to move a single coin cell case from a stored position to the receiving position, for example.

At the next process step 314, multiple coin cell cases can be picked from the case providing component. This can be done by a pick and place component picking the cases from the receiving position, which can involve the application of a vacuum to a specially designed end effector coupled to a robotic arm arrangement, for example. Such picking can be facilitated automatically by way of a processing component.

At subsequent process step 316, the multiple coin cell cases can be placed onto the multiple partially assembled coin cells to form fully assembled coin cells within the holding arrangement, which can be a bottom plate. This can also be done by the pick and place component, such as by moving the robotic arm and releasing the vacuum from the end effector, for example. Such placing can be facilitated automatically by way of a processing component.

At a following process step 318, the holding arrangement can be flipped. This can be done by a flipping component configured flip over the holding arrangement. Where the holding arrangement includes top and bottom plates, for example, then the flipping component can be configured to handle both the bottom and top plates of the holding arrangement. Various details of flipping a holding arrangement are set forth in method 220 of FIG. 10 above.

At a following process step 320, the fully assembled coin cells can be picked from the holding arrangement. This can be from the top plate when the holding arrangement is flipped, for example. This picking can also be done by the pick and place component picking the coin cells from the top plate, which can also involve movement of a robotic arm arrangement and the application of a vacuum to the end effector. Such fully assembled coin cell picking can be facilitated automatically by way of a processing component.

At the next process step 322, the fully assembled coin cells can be placed into a crimping component. This can also be done by the pick and place component, such as by moving the robotic arm and releasing the vacuum from the end effector, for example. Such placing into the crimper can be facilitated automatically by way of a processing component.

At subsequent process step 324, the fully assembled coin cells can be crimped using crimping component, which can be facilitated automatically by way of a processing component.

At a following process step 326, the crimped coin cells can be picked from the crimping component. This can also be done by the pick and place component, which can also involve movement of the robotic arm and application of vacuum to the end effector. Such crimped coin cell picking can be facilitated automatically by way of a processing component.

At the next process step 328, the crimped coin cells can be placed to a final location, which can be the holding arrangement, for example. This can also be done by the pick and place component, such as by moving the robotic arm and releasing the vacuum from the end effector. Such final location placing can be facilitated automatically by way of a processing component.

At decision step 330, an inquiry can be made as to whether more coin cells are to be formed or manufactured. In the event that more coin cells are to be formed, then the method can revert to process step 304 and steps 304-330 can all be repeated. If no further coin cells are desired, however, then the method can end at end step 332.

For the foregoing detailed method 300, it will be appreciated that not all process steps are necessary, and that other process steps and details may be added. Furthermore, the order of steps may be altered in some cases, and some steps may be performed simultaneously. For example, step 306 may be performed at one or more other stages in the overall process. As other examples, steps 306 and 308 may be performed simultaneously in stages, and steps 310-316 may all be performed simultaneously in some arrangements. Some steps may be broken down into detailed substeps, such as step 304 involving the automated picking and placing of a cell cap, electrodes, spacer, and spring within a well of the holding arrangement, for example. Further steps can include, for example, forming electrolyte materials of varying compositions and/or volumes and storing the different electrolyte materials into vials or other containers to be accessed by a fluid handling robot at step 308.

In some arrangements, various portions or subsets of detailed method 300 may be repeated before moving on to other portions of the method. For example, steps 304 through 318 may be repeated one or more times to form multiple flipped plates of fully assembled coin cells, after which steps 320 through 328 can be repeated one or more times to pick and crimp and place the fully assembled coin cells in multiple flipped plates. In some arrangements, even further or other different subsets of detailed method 300 may be repeated before moving on through the method. For example, steps 304 through 316 can be repeated, after which step 318 can be repeated, after which steps 320 through 328 can be repeated. Other possible process steps, details, variations, and extrapolations of detailed method 300 will be readily appreciated by those of skill in the art.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An automated coin cell battery manufacturing system, the system comprising:

a holding arrangement configured to hold multiple partially assembled coin cells therewithin, wherein each of the multiple partially assembled coin cells includes at least one electrode and at least one spacer placed within a coin cell cap;

an electrolyte dispensing component configured to automatically dispense electrolyte material into the multiple partially assembled coin cells within the holding arrangement, wherein the automatically dispensed electrolyte material is different for different coin cells within the multiple partially assembled coin cells;

a case providing component configured to store multiple coin cell cases and configured to automatically provide the stored coin cell cases, wherein the case providing component includes a tower component having an internal vertically oriented column forming a case storage region configured to hold a column of coin cell cases and a rotating component located beneath the tower component, the rotating component including a case recess that is sized and shaped to fit a single coin cell case therein;

a pick and place component configured to automatically pick the coin cell cases from the case providing component and to automatically place the coin cell cases on the multiple partially assembled coin cells to form fully assembled coin cells within the holding arrangement, wherein rotation of the rotating component results in moving a single coin cell case in the case recess from the column of coin cell cases to a case receiving position for the pick and place component; and a crimping component configured to automatically crimp the fully assembled coin cells.

2. The system of claim 1, wherein the pick and place component is further configured to automatically pick the fully assembled coin cells from the holding arrangement, to automatically place the fully assembled coin cells into the crimping component, to automatically pick the crimped coin cells from the crimping component, and to automatically place the crimped coin cells to a final location.

3. The system of claim 1, further comprising:

a partial assembly component configured to facilitate the automated formation of the multiple partially assembled coin cells within the holding arrangement.

4. The system of claim 3, wherein the pick and place component is further configured to automatically pick the electrodes and the spacers from the partial assembly component and to automatically place the electrodes and the spacers within the coin cell caps within the holding arrangement.

5. The system of claim 1, wherein the holding arrangement includes a bottom plate with bottom wells configured to hold the multiple partially assembled coin cells and a top plate with top wells configured to hold the fully assembled coin cells, and wherein the top plate fits atop the bottom plate such that each top well combines with a bottom well to form a combined well.

6. The system of claim 5, further comprising:

a flipping component configured to automatically place the top plate on top of the bottom plate while the fully assembled coin cells are within the bottom plate, to automatically flip over the bottom plate and top plate together such that all fully assembled coin cells are flipped over within their respective combined wells, and to automatically remove the bottom plate from the top plate such that the fully assembled coin cells remain within the top plate.

7. The system of claim 1, wherein the tower component of the case providing component further includes a second internal vertically oriented column forming a cap storage region configured to hold a column of coin cell caps and the rotating component further includes a cap recess separate from the case recess that is sized and shaped to fit a single coin cell cap therein, and wherein further rotation of the rotating component results in moving a single coin cell cap in the cap recess from the column of coin cell caps to a cap receiving position for the pick and place component.

8. The system of claim 1, wherein the pick and place component includes a robotic arm and an end effector configured to pick and place the coin cell cases.

9. The system of claim 8, wherein the end effector includes a suction component and a vacuum conduit coupled to the suction component, wherein the vacuum conduit is configured to be coupled to a vacuum source to provide a vacuum to the suction component.

10. The system of claim 1, further comprising:
a positioning component configured to position the holding arrangement; wherein the positioning component is configured to automatically move the holding arrangement to multiple different locations to facilitate automated activities of at least the electrolyte dispensing component and the pick and place component.

11. The system of claim 1, further comprising:
one or more processors in communication with and configured to control the automated functions of the electrolyte dispensing component, the case providing component, the pick and place component, and the crimping component.

12. The system of claim 1, wherein the rotating component of the case providing component is disk shaped and is configured to be driven in clockwise and counterclockwise directions to move the case recess back and forth between the column of coin cell cases and the case receiving position.

13. An automated coin cell battery manufacturing system, the system comprising:
a holding arrangement configured to hold multiple partially assembled coin cells therewithin, each of the multiple partially assembled coin cells including at least one electrode and at least one spacer placed within a coin cell cap, wherein the holding arrangement includes a bottom plate with bottom wells configured to hold the multiple partially assembled coin cells during coin cell assembly and a top plate with top wells configured to hold multiple fully assembled coin cells from the multiple partially assembled coin cells after coin cell assembly, and wherein the top plate fits atop the bottom plate such that each top well combines with a bottom well to form a combined well configured to hold a fully assembled coin cell therewithin;
an electrolyte dispensing component configured to automatically dispense electrolyte material into the multiple partially assembled coin cells within the holding arrangement, wherein the automatically dispensed electrolyte material is different for different coin cells within the multiple partially assembled coin cells;
a cap and case providing component configured to automatically store and provide multiple coin cell caps and coin cell cases, the cap and case providing component having a tower component and a rotating component, wherein the tower component includes a first internal vertically oriented column forming a case storage region configured to hold a column of coin cell cases and a second internal vertically oriented column forming a cap storage region configured to hold a column of coin cell caps, wherein the rotating component is located directly beneath the tower component and includes a case recess sized and shaped to fit a single coin cell case therein and a cap recess separate from the case recess and sized and shaped to fit a single coin cell cap therein, and wherein the rotating component is disk shaped and is configured to be driven in clockwise and counterclockwise directions to move the case recess back and forth between the column of coin cell cases and the case receiving position;
a pick and place component configured to automatically pick the coin cell cases from the case providing component and to automatically place the coin cell cases on the multiple partially assembled coin cells to form fully assembled coin cells within the holding arrangement, wherein a first rotation of the rotating component results in moving a single coin cell case in the case recess from the column of coin cell cases to a case receiving position for the pick and place component, and wherein a second rotation of the rotating component results in moving a single coin cell cap in the cap recess from the column of coin cell caps to a cap receiving position for the pick and place component;
a flipping component configured to automatically place the top plate on top of the bottom plate while the fully assembled coin cells are within the bottom plate, to automatically flip over the bottom plate and top plate together such that all fully assembled coin cells are flipped over within their respective combined wells, and to automatically remove the bottom plate from the top plate such that the fully assembled coin cells remain within the top plate; and
a crimping component configured to automatically crimp the fully assembled coin cells.

14. A method of manufacturing coin cell batteries, the method comprising:
dispensing automatically electrolyte material into multiple partially assembled coin cells within a holding arrangement, each of the multiple partially assembled coin cells including at least one electrode and at least one spacer placed within a coin cell cap, wherein the automatically dispensed electrolyte material is different for different coin cells within the multiple partially assembled coin cells;
providing automatically multiple coin cell cases from a case providing component, wherein the case providing component includes a tower component having an internal vertically oriented column forming a case storage region configured to hold a column of coin cell cases and a rotating component located beneath the tower component, the rotating component including a recess sized and shaped to fit a single coin cell case therein, wherein rotation of the rotating component results in moving a single coin cell case in the recess from the column of coin cell cases to a case receiving position for a pick and place component;
picking automatically the multiple coin cell cases from the case providing component;

placing automatically the multiple coin cell cases onto the multiple partially assembled coin cells to form fully assembled coin cells within the holding arrangement; and crimping automatically the fully assembled coin cells with a crimping component.

15. The method of claim 14, further comprising:

forming automatically the multiple partially assembled coin cells within the holding arrangement.

16. The method of claim 14, further comprising:

picking automatically the fully assembled coin cells from the holding arrangement;

placing automatically the fully assembled coin cells into the crimping component;

picking automatically the crimped coin cells from the crimping component; and placing automatically the crimped coin cells to a final location.

17. The method of claim 14, wherein the holding arrangement includes a bottom plate configured to hold the multiple partially assembled coin cells and a top plate configured to hold the multiple fully assembled coin cells, and wherein the top plate fits atop the bottom plate.

18. The method of claim 17, further comprising:

placing automatically the top plate on top of the bottom plate while the multiple fully assembled coin cells are within the bottom plate;

flipping over automatically the bottom plate and top plate together; and removing automatically the bottom plate from the top plate such that the multiple fully assembled coin cells remain within the top plate.

19. The method of claim 14, further comprising:

rotating automatically the rotating component to move a single case from the bottom of the column of cases to a receiving position to be picked from the case providing component.

20. The method of claim 14, further comprising:

moving automatically the holding arrangement to multiple different locations to facilitate the dispensing, the picking, and the placing.

* * * * *